United States Patent
Kumagai

(10) Patent No.: US 7,826,087 B2
(45) Date of Patent: Nov. 2, 2010

(54) IMAGE FORMING APPARATUS

(75) Inventor: Kazuyuki Kumagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1062 days.

(21) Appl. No.: 11/529,322

(22) Filed: Sep. 29, 2006

(65) Prior Publication Data

US 2007/0086022 A1 Apr. 19, 2007

(30) Foreign Application Priority Data

Oct. 3, 2005 (JP) ............................. 2005-290132
Jul. 25, 2006 (JP) ............................. 2006-202441

(51) Int. Cl.
*G06K 15/00* (2006.01)
*H04N 1/04* (2006.01)
*H04N 1/00* (2006.01)

(52) U.S. Cl. ...................... 358/1.16; 358/404; 358/444

(58) Field of Classification Search ................. 358/1.6, 358/1.15, 401, 443, 447, 448, 1.16, 444, 358/404
See application file for complete search history.

(56) References Cited

U.S. PATENT DOCUMENTS

| | | | | |
|---|---|---|---|---|
| 5,392,136 A | * | 2/1995 | Nobuta et al. ................ | 358/444 |
| 6,832,319 B1 | * | 12/2004 | Bell et al. ..................... | 713/193 |
| 7,576,779 B2 | * | 8/2009 | Tanaka et al. ............. | 348/211.4 |
| 2005/0270586 A1 | * | 12/2005 | Hashimoto .................. | 358/400 |
| 2005/0279833 A1 | * | 12/2005 | Tanaka ................... | 235/462.46 |
| 2006/0043166 A1 | * | 3/2006 | Matsumoto et al. ......... | 235/376 |
| 2006/0249566 A1 | * | 11/2006 | Alleshouse ................. | 235/375 |
| 2007/0024896 A1 | * | 2/2007 | Bounar ....................... | 358/1.15 |

FOREIGN PATENT DOCUMENTS

| | | | |
|---|---|---|---|
| JP | 05183859 | * | 7/1993 |
| JP | 2002-320061 | | 10/2002 |
| JP | 2003-175657 | | 6/2003 |
| JP | 2003-316526 | | 11/2003 |

* cited by examiner

*Primary Examiner*—Jerome Grant, II
(74) *Attorney, Agent, or Firm*—Oblon, Spivak, McClelland, Maier & Neustadt, L.L.P.

(57) ABSTRACT

An image forming apparatus includes an interface detachably connecting a portable recording medium and a first writing part writing setting information stored in a storage unit internally mounted in the image forming apparatus to the portable recording medium with identification information of the image forming apparatus.

17 Claims, 18 Drawing Sheets

FIG.13

RESTORE SETTING INFORMATION OF THIS DEVICE

DO YOU RESTORE THIS
SETTING INFORMATION?

3: 2006/03/07 00:00

CHECK ITEM(S) TO BE REPLACED IN THIS SETTING INFORMATION.

- ☑ SETTING ITEM 10
- ☐ SETTING ITEM 11
- ☐ SETTING ITEM 12
- ☑ SETTING ITEM 13
- ☐ SETTING ITEM 14
- ☐ SETTING ITEM 20
- ☐ SETTING ITEM 21
- ☐ SETTING ITEM 30

[ OK ]  [ CANCEL ]

IMAGE FORMING APPARATUS

BACKGROUND OF THE INVENTION

1. Field of the Invention

The present invention generally relates to an image forming apparatus including an interface of a portable recording medium being detachable, and more particularly to the image forming apparatus in which setting information can be backed up to the portable recording medium and/or restored from the portable recording medium, so as to easily manage a plurality of image forming apparatuses.

2. Description of the Related Art

Recently, an image forming apparatus accommodating various functions acting as a printer, a copier, a facsimile, a scanner, and a like within a single chassis has been widely used. In the image forming apparatus being a compound type, a display part, a print part, and imaging part are mounted within the single chassis, and three applications respectively corresponding to the printer, the copier, and the facsimile are implemented. By switching among three applications, the image forming apparatus functions as the printer, the copier, the scanner, or the facsimile.

Since more functions are implemented into the image forming apparatus, the number of items for setting to the image forming apparatus has been increased. In general, various items are manually set by an administrator at an operation panel of the image forming apparatus or through a Web screen displayed at a PC (Personal Computer) or a like connected to the image forming apparatus via a network.

Accompanying to the increase of the items to set, item values being set are stored in a case of recovering the image forming apparatus when a malfunction occurs. For example, in an information processing system described in Japanese Laid-open Patent Application No. 2003-316526, when configuration information of the information processing system is changed, the configuration information being changed is stored to a plurality of different portable recording medium. Thus, it becomes easily to recover the information processing system.

Moreover, in a print condition setting method for a printer described in Japanese Laid-open Patent Application No. 2003-175657, it becomes possible to select a desired print condition file from a memory card recording a plurality of print condition files.

However, in the information processing system described in the Japanese Laid-open Patent Application No. 2003-316526, only a single information processing system can be handled. Also, in a case of simultaneously managing a plurality of the information processing systems, there is a problem in that the configuration information cannot be shared among the plurality of the information processing systems.

In addition, in the print condition setting method for the printer described in the Japanese Laid-open Patent Application No. 2003-175657, is the setting information to use can be selected from a plurality of sets of setting information. However, the Japanese Laid-open Patent Application No. 2003-175657 simply discloses to read the setting information from a memory card but does not disclose a means for re-using the setting information of a device which is stored in the memory card. Thus, there is no means to safely conduct a backup and a restore of the setting information.

SUMMARY OF THE INVENTION

The present invention solves or reduces one or more of the above problems.

According to one aspect of the present invention, there is provided a image forming apparatus which includes an interface detachably connecting a portable recording medium; and a first writing part writing setting information stored in a storage unit internally mounted in the image forming apparatus to the portable recording medium with identification information of the image forming apparatus.

In the image forming apparatus according to the present invention, it is possible to back up the setting information by recording the setting information of the image forming apparatus to the portable recording medium.

According to another aspect of the present invention, there is provided an image forming apparatus which includes an interface detachably connecting a portable recording medium a reading part reading setting information stored in the portable recording medium when the portable recording medium is detachably connected to the interface; a second writing part writing the setting information read by the reading part to a storage unit internally mounted in the image forming apparatus; and a determining part determining whether or not the setting information is written to the storage unit by the reading part.

In the image forming apparatus according to the present invention, a plurality of sets of the setting information can be read from the portable recording medium, and it is determined whether or not each of the sets of the setting information can be written to the storage unit internally mounted in the image forming apparatus. Accordingly, it is possible to restore the setting information being backed up in the portable recording medium to a proper image forming apparatus.

An embodiment according to the present invention can be achieved by a program for causing a computer to conduct processes described above in the image forming apparatus or by a computer-readable recording medium recorded with a program code.

According to the present invention, the setting information of the image forming apparatus can be stored to the portable recording medium detachably connected to the image forming apparatus, and the setting information can be backed up and/or restored for the image forming apparatus. Also, it is possible to back up and/or restore the setting information for other image forming apparatuses.

Moreover, by storing the setting information and information individually specifying a device to the portable recording medium detachably connected to image forming apparatus, it is possible to control restoring the setting information to the image forming apparatus alone from which the setting information is backed up.

BRIEF DESCRIPTION OF THE DRAWINGS

In the following, embodiments of the present invention will be described with reference to the accompanying drawings.

FIG. 13 is a diagram showing the confirmation screen for restoring the setting information of the image forming apparatus according to the embodiment of the present invention;

DESCRIPTION OF THE PREFERRED EMBODIMENT

In the following, an embodiment of the present invention will be described with reference to the accompanying drawings.

Figure 1:
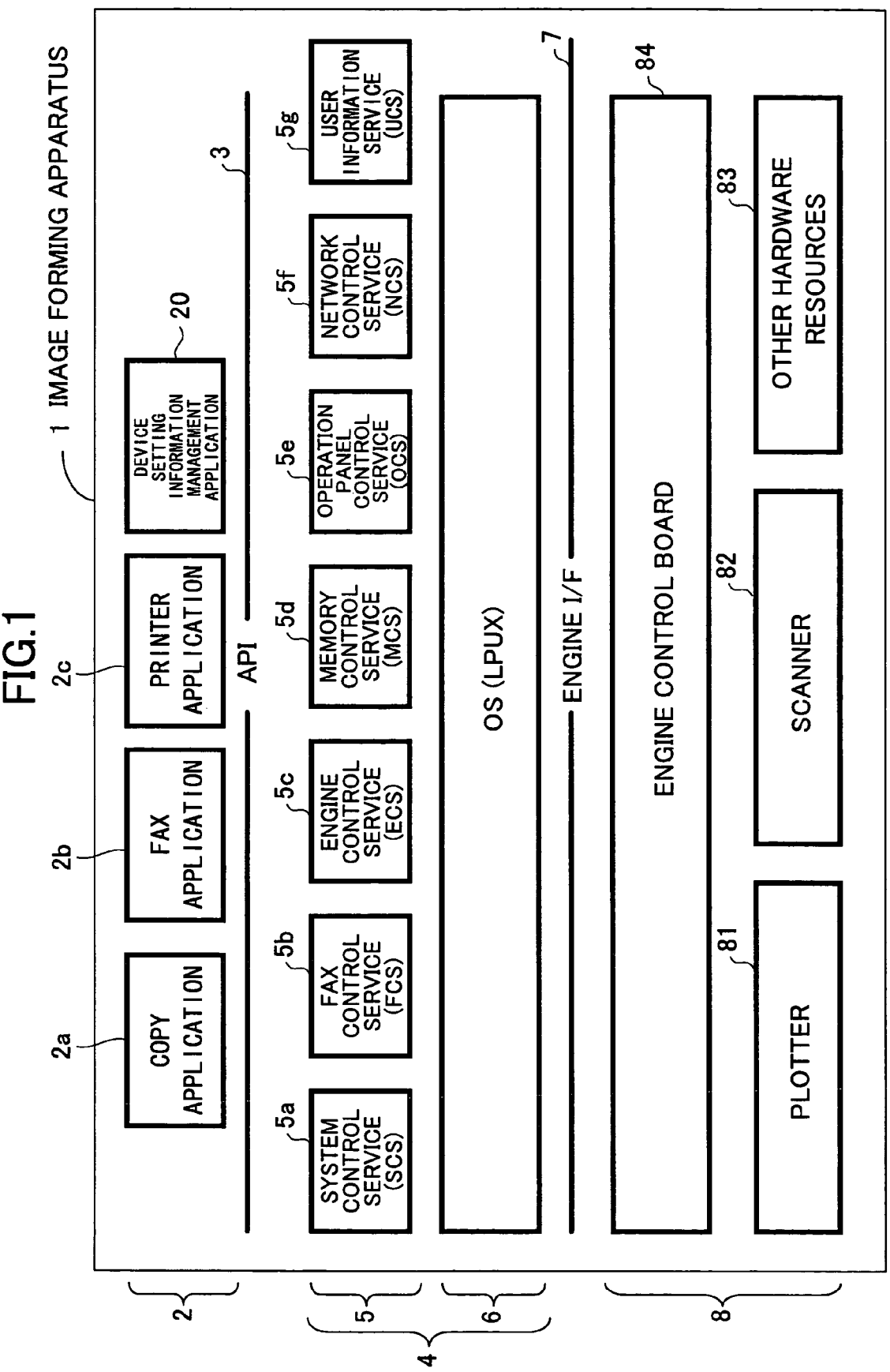
FIG. 1 is block diagram showing a functional configuration of an image forming apparatus merging various image forming functions according to the embodiment of the present invention.

For example, a functional configuration as shown in FIG. 1 is formed in the image forming apparatus merging various image forming functions according to the embodiment of the present invention. FIG. 1 is block diagram showing the functional configuration of the image forming apparatus merging various image forming functions according to the embodiment of the present invention. In FIG. 1, the image forming apparatus 1 includes an application layer 2, a platform layer 4, and an engine part 8. An interface 3 is an application program interface (API) provided by the platform layer 4 with respect to the application layer 2, and an interface 7 is an engine interface (I/F) between the platform layer 4 and the engine part 8.

The application layer 2 is a software group which conducts processes in the image forming apparatus 1, and includes a copy application 2a as an application for a copy, a fax application 2b as an application for a fax, a printer application 2c as an application for a printer, and a device setting information management application 20 for conducting a management of a backup of setting information of the image forming application 1 to an external portable recording medium and a restore of the setting information being stored in the external portable recording medium to the image forming apparatus 1.

The platform layer 4 is a software group for providing a service function being commonly shared with applications 2a, 2b, 2c, and 20 of the application layer 2 through the interface 3, and is formed by a service layer 5 and an OS (Operating System) layer 6.

The service layer 5 includes a system control service (SCS) 5a including a plurality of functions such as an application management, an operation panel control, a system screen display, an LED (Light Emitting Diode) display, a resource management, an interruption control, and a like, a fax control service (FCS) 5b, an engine control service (ECS) 5c for controlling an engine part, a memory control service (MCS) 5d for conducting a memory control, an operation panel control service (OCS) 5e for controlling an operation panel (operation part) being an interface to an user, a network control service (NCS) 5f for providing services available in common with respect to an application which needs a network input and output, and a user information control service (UCS) 5g for managing user authentication information.

The engine part 8 includes engines such as a plotter 81, a scanner 82, and other hardware resources 83, and an engine control board 84 controlling these engines.

Figure 2:
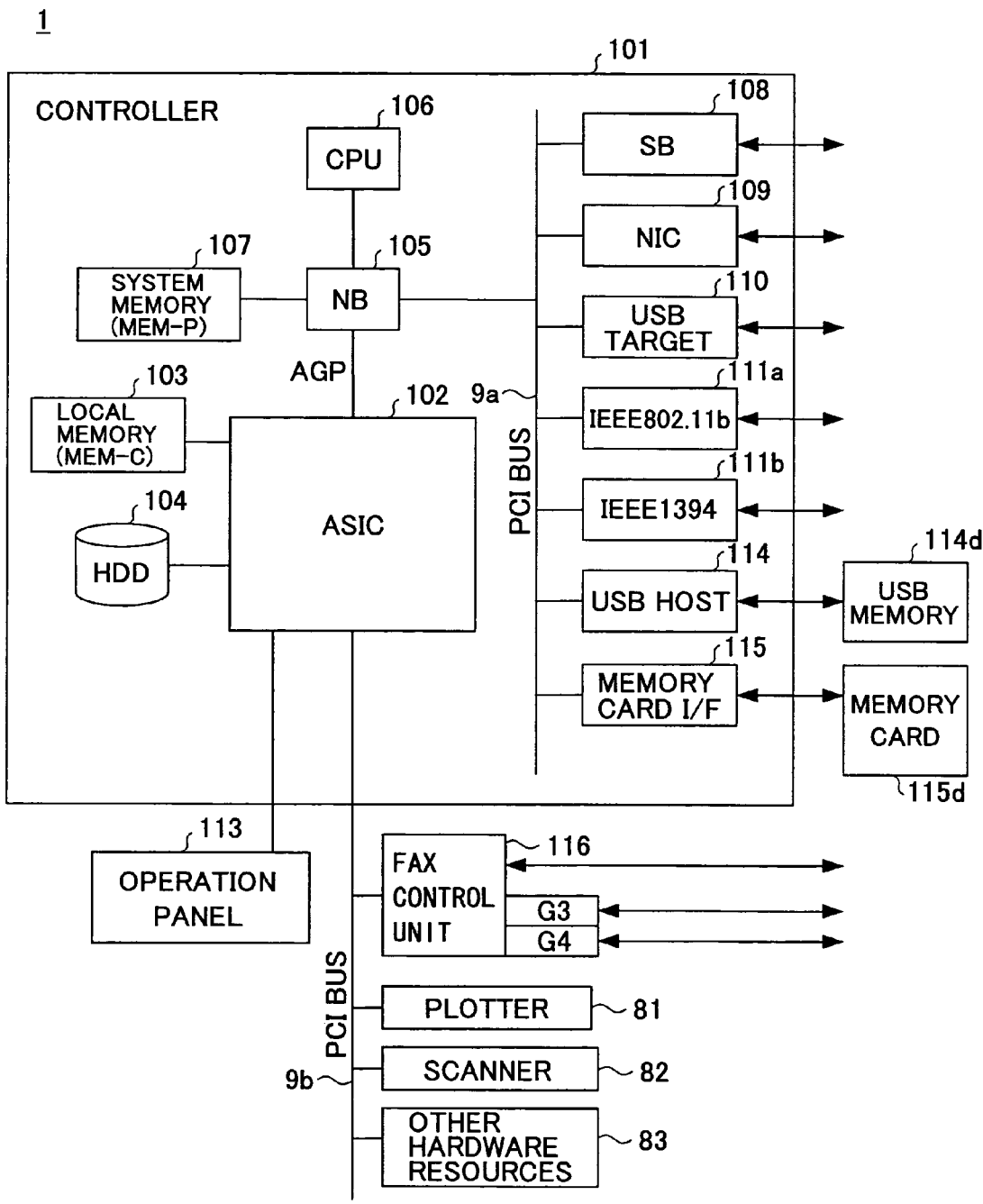
FIG. 2 is a block diagram showing a hardware configuration of the image forming apparatus according to the embodiment of the present invention.

FIG. 2 is a block diagram showing a hardware configuration of the image forming apparatus according to the embodiment of the present invention. In FIG. 2, the image forming apparatus 1 is configured so that a controller 101 for conducting a main control operation in the image forming apparatus 1 is connected to an operation panel 113, a fax control unit 116, the plotter 81, the scanner 82, and the other hardware resources 83.

In the controller 101, an ASIC (Application Specific Integrated Circuit) 102 being an IC (Integrated Circuit) for an image process is connected to a CPU (Central Processing Unit) 106 being an IC for a general control through an NB (North Bridge) 105.

A PCI (Peripheral Component Interconnect) bus 9a of the NB 105 is connected to an SB (South bridge) 108 for connecting to a peripheral device or a like, an NIC (Network Interface Card) 109 for controlling a network communication, a USB (Universal Serial Bus) target 110 capable of reading out data from a USB disk, an IEEE802.11b 111a as an IEEE 802.11b interface, an IEEE1394 111b as an IEEE1394 interface, a USB host 114 capable of sending and receiving a large amount of image data by connecting to another USB target (for example, a USB memory), and a memory card interface (I/F) 115 for inputting and outputting a program and data to and from a memory card 115*d* such as an SD (Secure Digital) memory card or a like.

The ASIC 102 is connected to a local memory (MEM-C) 103 as a storage unit and an HDD (Hard Disk Drive) 104, and the NB 105 is connected to a system memory (MEM-P) 107 as another storage unit.

In the following, processes which control a backup of the setting information to the external portable recording medium and a restore of the setting information to the image forming apparatus 1 will be described. In the following drawings, configuration parts and process flows related to the processes according to the present invention are shown, but other configuration parts and process flows implemented in the image forming apparatus 1 are omitted.

Figure 3:
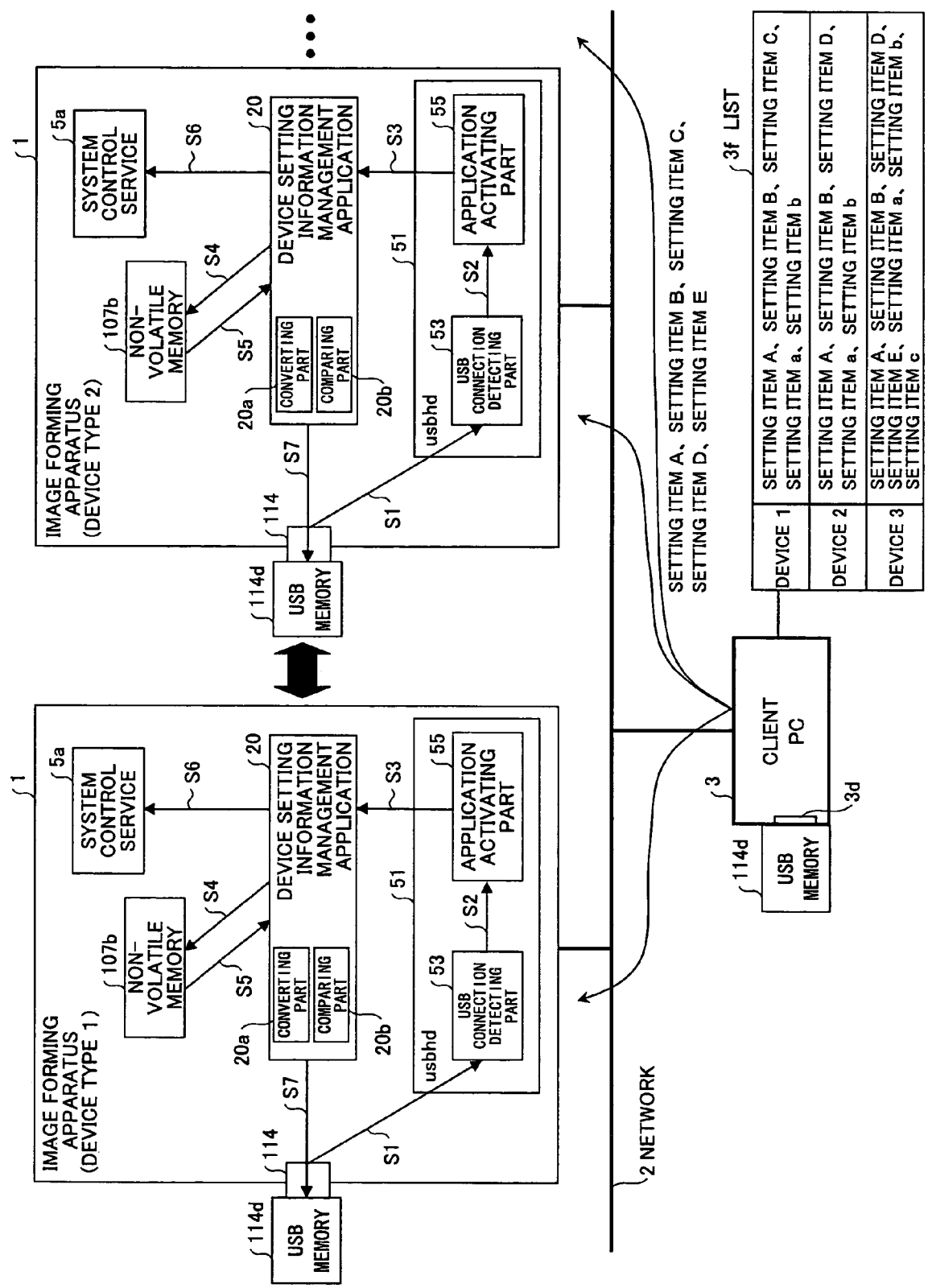
FIG. 3 is a diagram showing a functional configuration for realizing the processes according to the present invention.

FIG. 3 is a diagram showing a functional configuration for realizing the processes according to the present invention. In FIG. 3, a plurality of the image forming apparatuses 1 are connected to a client PC (Personal Computer) 3 through a network 2. Setting information of the image forming apparatus 1 can be backed up to the USB memory 114*d* for each of the plurality of the image forming apparatuses 1. Alternatively, the setting information of the image forming apparatus 1 can be transmitted to the client PC 3 through the network 2 and backed up to another USB memory 114*d* connected to the client PC 3.

First, the functional configuration of the image forming apparatus 1 will be described by explaining a backup process for conducting the backup to the USB memory 114*d* as an example. In FIG. 3, when the USB memory 114*d* as the external portable recording medium is connected to the image forming apparatus 1, a USB connection detecting part 53 of a usbhd (USB host daemon) 51 in the network control service 5*f* (FIG. 1) detects this connection (step S1), and sends a notice indicating that the USB memory 114*d* is connected, to an application activating part 55 in the usbhd 51 (step S2). In response to the notice, the application activating part 55 instructs the device setting information management application 20 to begin writing the setting information (step S3).

The device setting information management application 20 accesses a non-volatile memory 107*b* (step S4), and reads out the setting information (step S5). Then, the device setting information management application 20 acquires a device type and a device ID (for example, a serial number) of the image forming apparatus 1 and a current time from the system control service 5*a* (step S6), and writes the setting information read from the non-volatile memory 107*b* to the USB memory 114*d* (step S7).

As described above, the setting information backed up into the USB memory 114*d* can be restored to the image forming apparatus 1 from which the setting information is backed up to the USB memory 114*d*. Also, the setting information backed up into the USB memory 114*d* can be restored to other image forming apparatuses 1 by connecting the USB memory 114 thereto. A backup process and a restore process will be described later in detail.

The USB 114*d* is a storage unit being used a USB master storage class by a USB connection. The usbhd 51 is implemented in the network control service 5*f* (FIG. 1) as one of functions conducting a communication control. The usbhd 51 monitors a device to be connected to the USB host 114 by the USB connection detecting part 53, and activates the device setting information management application 20 by the application activating part 55.

The non-volatile memory 107*b* stores the setting information which a user set by using any one of applications 2*a*, 2*b*, and 2*c* (FIG. 1) through the operation panel 113 (FIG. 2). For example, the non-volatile memory 107*b* can be a part of a storage area within the system memory 107 or the HDD 104.

As described above, the device setting information management application 20 acquires the setting information stored in the non-volatile memory 107*b* and writes the setting information to the USB memory 114*d* when the setting information is backed up. Also, the device setting information management application 20 reads out the setting information stored in the USB memory 114*d* and stores the setting information to the non-volatile memory 107*b*.

Moreover, the device setting information management application 20 implements a converting part 20*a* and a comparing part 20*b*.

The converting part 20*a* is a process part for converting the setting information into a predetermined format when the setting information is written to the USB memory 114*d* in the step S7. For example, the setting information may be converted into a shell command format and written to the USB memory 114*d*. Accordingly, the client PC 3 mounting a USB interface 3*d* for the USB connection simply reads out the setting information, which is converted into the shell command format and backed up, from the USB memory 114*d* connected to the USB interface 3*d*, and sends the setting information to one or more image forming apparatuses 1 through the network 2, so as to easily restore the setting information simultaneously.

The converting part 20*a* may convert the setting information into a PJL (Print Job Language) data format. In a case in that the image forming apparatus 1 cannot connect to the network 2, the client PC 3 is connected to the image forming apparatus 1 by a parallel connection, and sends the setting information, which is converted into the PJL data format and backed up in the USB memory 114*d*, to the image forming apparatus 1. Accordingly, the setting information can be easily restored to the image forming apparatus 1.

Also, a process for converting into the shell command format and a process for converting into the PJL data format may be implemented in the converting part 20*a*, and can be switched by a user.

The comparing part 20*b* is a process part to compare current setting information of the image forming apparatus and setting information being backed up in the USB memory 114*d* when the setting information is backed up or restored. A comparison result of the comparing part 20*b* is displayed at the operation panel 113, so that the user can confirm a difference between the current setting information of the image forming apparatus 1 and the setting information of the USB memory 114*d*.

An operation conducted from the client PC 3 through the network 2 will be described with reference to FIG. 3. The client PC 3 connects to the image forming apparatus 1 through the network 2 in response to a user instruction, activates the device setting information management application 20 of the image forming apparatus 1 by sending a setting information request, and acquires the setting information from the non-volatile memory 107*b*. In the image forming apparatus 1, the setting information request is received through the network 2, the network control service (NCS) 5*f* activates the device setting information management application 20.

The client PC 3 acquires the setting information from the device setting information management application of the image forming apparatus 1 through the network 2, and backs up the setting information to the USB memory 114*d* being connected to the client PC 3. When a backup of the setting information has been stored in the USB memory 114*d*, the client PC 3 compares the setting information acquired from the image forming apparatus 1 through the network 2 and the backup stored in the USB memory 114d, and displays the difference between the setting information and the backup. The user selects items of the setting information to back up and stores to the USB memory 114d.

First, a case of restoring the setting information to a single image forming apparatus 1 will be described. The user inserts the USB memory 114d to the USB interface 3d of the client PC 3, selects one of the plurality of the image forming apparatuses 1 being connected to the network 2, and restores the setting information stored in the USB memory 114d to the selected image forming apparatus 1.

Next, a case of simultaneously restoring the setting information to the plurality of the image forming apparatuses 1 being connected to the network 2 will be described. There are different device types in the plurality of the image forming apparatuses 1. Accordingly, the client PC 3 includes a list 3f storing the setting information for each device type.

In the setting information, there are setting items which can be similarly set to different device types such as a print timeout period, and setting items which cannot be set to different device types such as an IP address being identical to each device. In the list 3f, setting items A, B, C, D, and E (capital letters) indicate common setting information which can be similarly set to the different device types, and setting items a, b, and c (lower case letters) indicate special setting information which cannot be set to the different device types.

When the user indicates a simultaneous setting to the plurality of the image forming apparatuses 1 connected to the network 2, the client PC 3 acquires the setting items A, B, C, D, and E being the common setting information for the setting information of a device type 1, a device type 2, and a device type 3 managed in the list 3f, and sends the setting items A, B, C, D, and E to the plurality of the image forming apparatuses 1. In each of the plurality of the image forming apparatuses 1, the common setting information is received, only the setting items of the setting information existing in the image forming apparatus 1 itself are restored by using the common setting information.

By implementing a special application, the client PC 3 can realize the backup process and the restore process of the setting information by using the USB memory 114d as described above. Alternatively, the client PC 3 may implement Active X™ for conducting the backup process and the restore process, and a Web browser of the client PC 3 may be a user interface.

Figure 4:
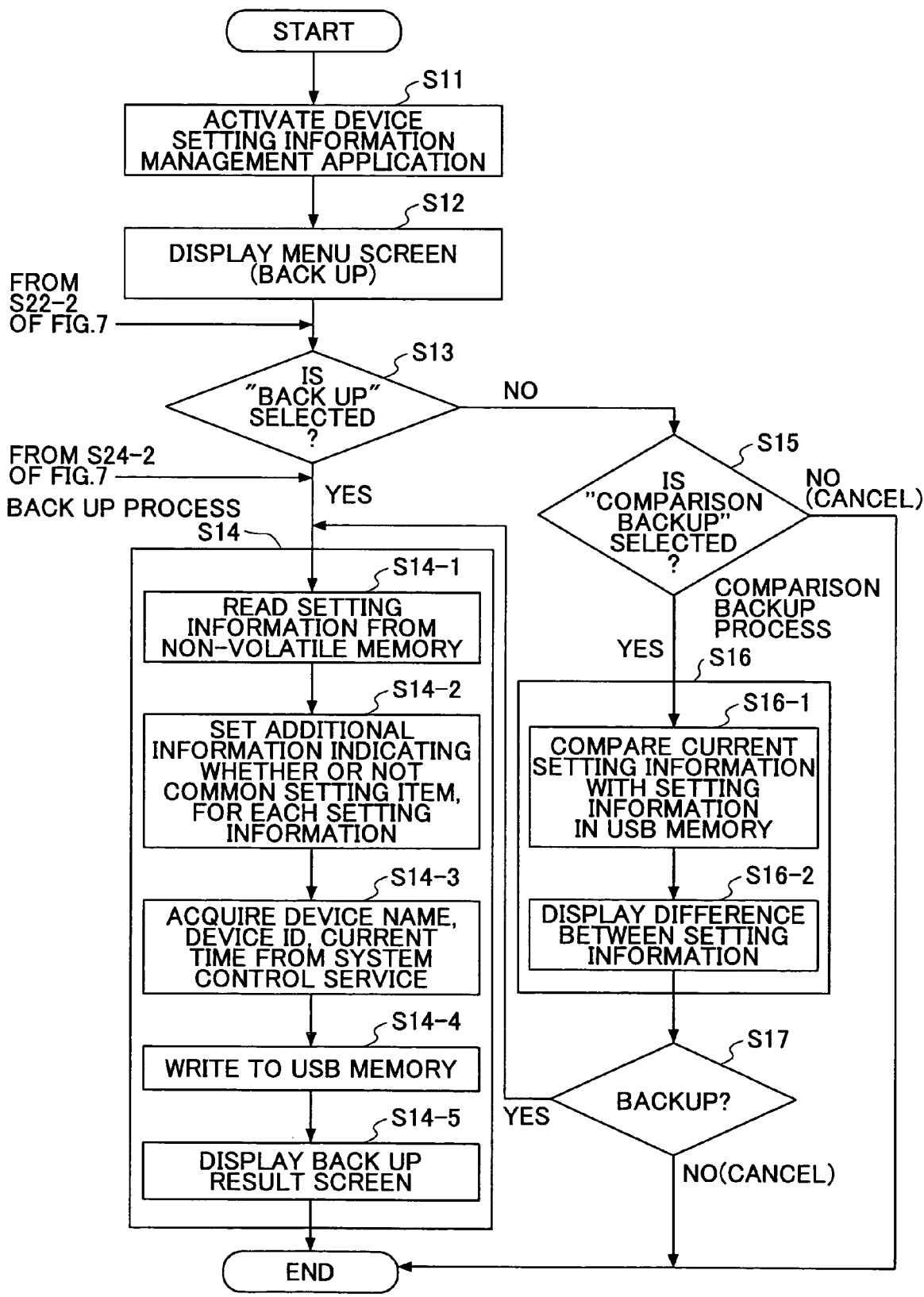
FIG. 4 is a flowchart for explaining the backup process for writing the setting information to the external portable recording medium, according to the embodiment of the present invention.

The backup process for each of the image processing apparatuses 1 to write the setting information to the USB memory 114d as an external portable recording medium will be described with reference to FIG. 4, FIG. 5, and FIG. 6. FIG. 4 is a flowchart for explaining the backup process for writing the setting information to the external portable recording medium, according to the embodiment of the present invention.

In FIG. 4, when the device setting information management application 20 is activated by a write start instruction of the setting information from the application activating part 55 (step S11), the device setting information management application 20 displays a menu screen for a backup at the operation panel 113 (step S12).

The device setting information management application 20 determines whether or not the user selects "BACKUP" (step S13). When the user selects "BACKUP", the device setting information management application 20 conducts the backup process (step S14).

In the backup process in step S14, the device setting information management application 20 reads the setting information from the non-volatile memory 107b (step S14-1), and sets additional information indicating the common setting information for each setting item of the setting information (step S14-2).

Types of the additional information are as follows:
additional information 1 indicating whether or not the setting item is an item as the common setting information among the different device types,
additional information 2 indicating whether or not the setting item is an item as the common setting information among the different apparatuses being the same device type, and
additional information 3 indicating whether or not the setting item is prohibited to be set in common among different devices.

One of the additional information 1, the additional information 2, and the additional information 3 is selected. For example, the additional information 1 may be a value of the print timeout period or a like, and the additional information 3 may be the IP address, the device name, or the like.

Next, the device setting information management application 20 acquires the device type, the device ID, and the current time from the system control service 5a (step S14-3).

Subsequently, the device setting information management application 20 writes the setting information to the USB memory 114d with the device type, the device ID, the current time (step S14-4), and displays a backup result screen showing the backup result (step S14-5). Then, the device setting information management application 20 terminates the backup process.

In the step S13, when the user does not select "BACKUP", the device setting information management application 20 further determines whether or not the user selects "COMPARISON BACKUP" (step s15). When the user does not select "COMPARISON BACKUP" ("CANCEL" is selected), the device setting information management application 20 terminates the backup process.

On the other hand, when the user selects "COMPARISON BACKUP", the comparing part 20b conducts a comparison backup process (step S16).

In the comparison backup process in the step S16, the comparing part 20b compares the current setting information of the image forming apparatus 1 and the setting information backed up in the USB memory 114d (step S16-1). Based on the comparison result, the difference between the current setting information of the image forming apparatus 1 and the setting information backed up in the USB memory 114d at the operation panel 113 (step S16-2).

The device setting information management application 20 determines whether or not the user instructs to execute the backup (step S17). When the backup is not instructed ("CANCEL" is selected), the device setting information management application 20 terminates the backup process. On the other hand, when the backup is instructed, the device setting information management application 20 advances to the step S14, and conducts the backup process as described above.

There is a case in which the user changes the setting information of the image forming apparatus 1 after the backup of the setting information, and the user desires to set the setting information being backed up. When the setting information is restored to the image forming apparatus 1 from which the setting information is backed up to the USB memory 114d, and the USB memory 114d is inserted into the image forming apparatus 1, the setting items of the setting information, to which the additional information 1, the additional information 2, and the additional information 3 are set, is restored to the image forming apparatus 1.

When the USB memory 114d is inserted into another image forming apparatus 1 which is the same device type as the device type of the image forming apparatus 1 of which the setting information is backed up, the setting items of the setting information, to which the additional information 1 and additional information 2 are set, is restored to the another image forming apparatus 1.

When the USB memory 114d is inserted into the image forming apparatus 1 which is a different device type from the device type of the setting information being backed up, only the setting items of the setting information, to which the additional information 1 is set, are restored to the image forming apparatus 1.

Figure 5:
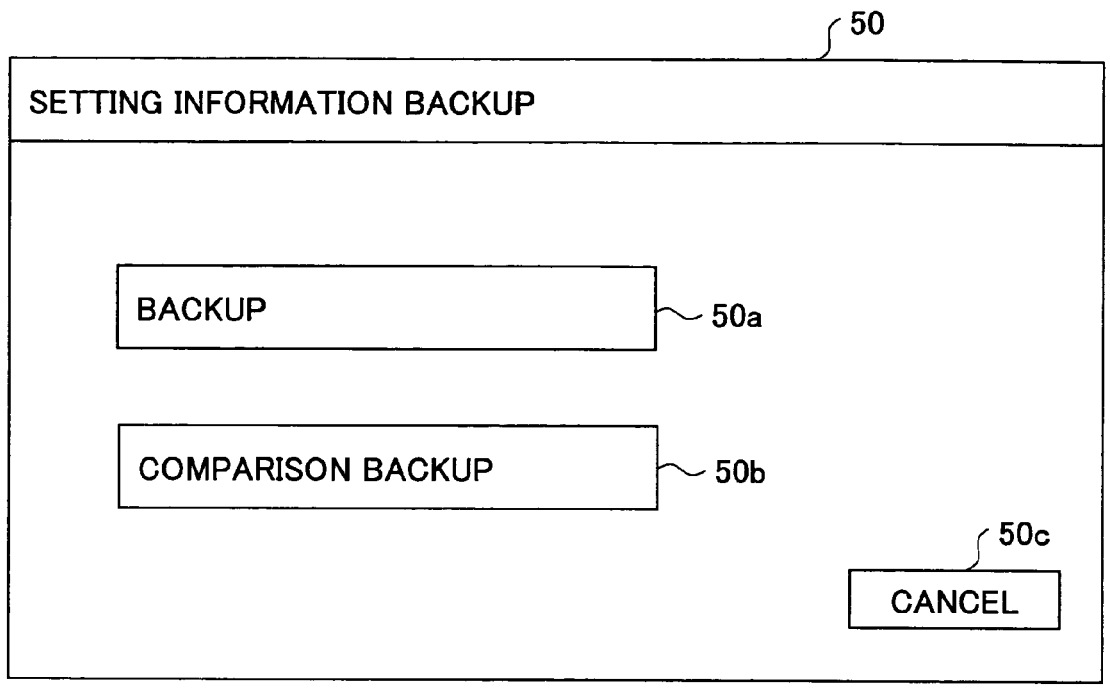
FIG. 5 is a diagram showing an example of the menu screen displayed in the step S12 in FIG. 4, according to the embodiment of the present invention.

FIG. 5 is a diagram showing an example of the menu screen displayed in the step S12 in FIG. 4, according to the embodiment of the present invention. In FIG. 5, a menu screen 50 includes a backup button 50a for conducting the backup of the setting information, and a comparison backup button 50b for conducting the comparison backup, and a cancel button 50c for canceling the backup.

In the step S12 in FIG. 4, when the user presses the backup button 50a, the backup process in the step S14 is conducted. When the user presses the comparison backup button 50b, the comparison backup process in the step S16 is conducted. On the other hand, when the user presses the cancel button 50c, the setting information is not backed up.

Figure 6:
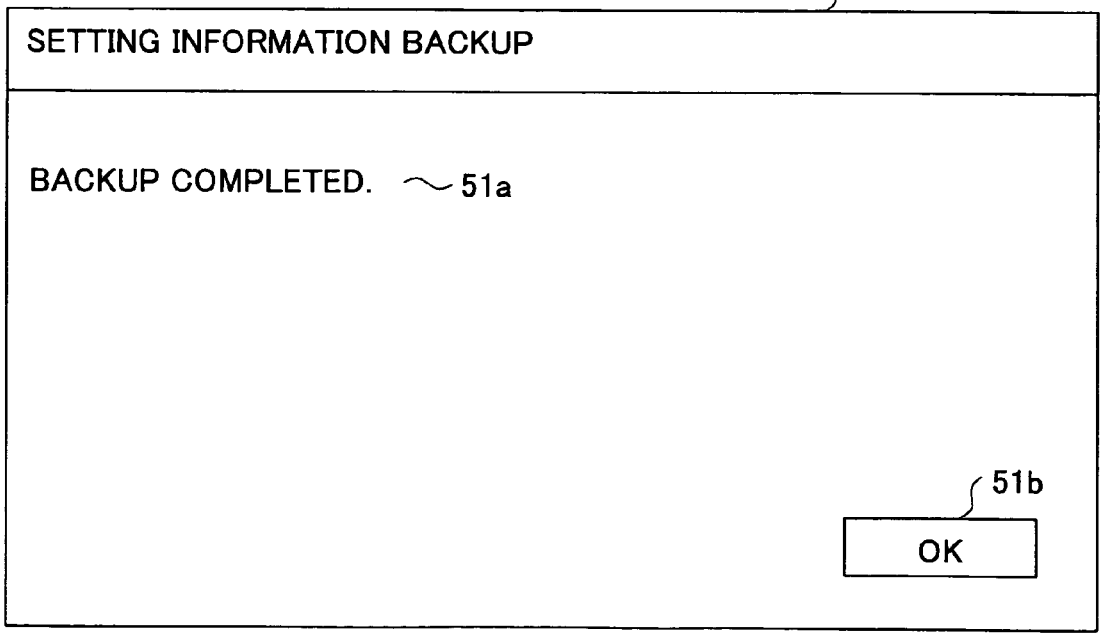
FIG. 6 is a diagram showing an example of the backup result screen displayed in the step S14-5 in FIG. 4, according to the embodiment of the present invention.

FIG. 6 is a diagram showing an example of the backup result screen displayed in the step S14-5 in FIG. 4, according to the embodiment of the present invention. In FIG. 4, a backup result screen 51 includes a display area 51a for displaying a message indicating a result of the backup process, and an OK button 51b for closing the backup result screen 51.

In the step S14-5 in FIG. 4, when the user presses the OK button 51b, the device setting information management application 20 closes the backup result screen 51, and terminates the backup process.

Figure 7:
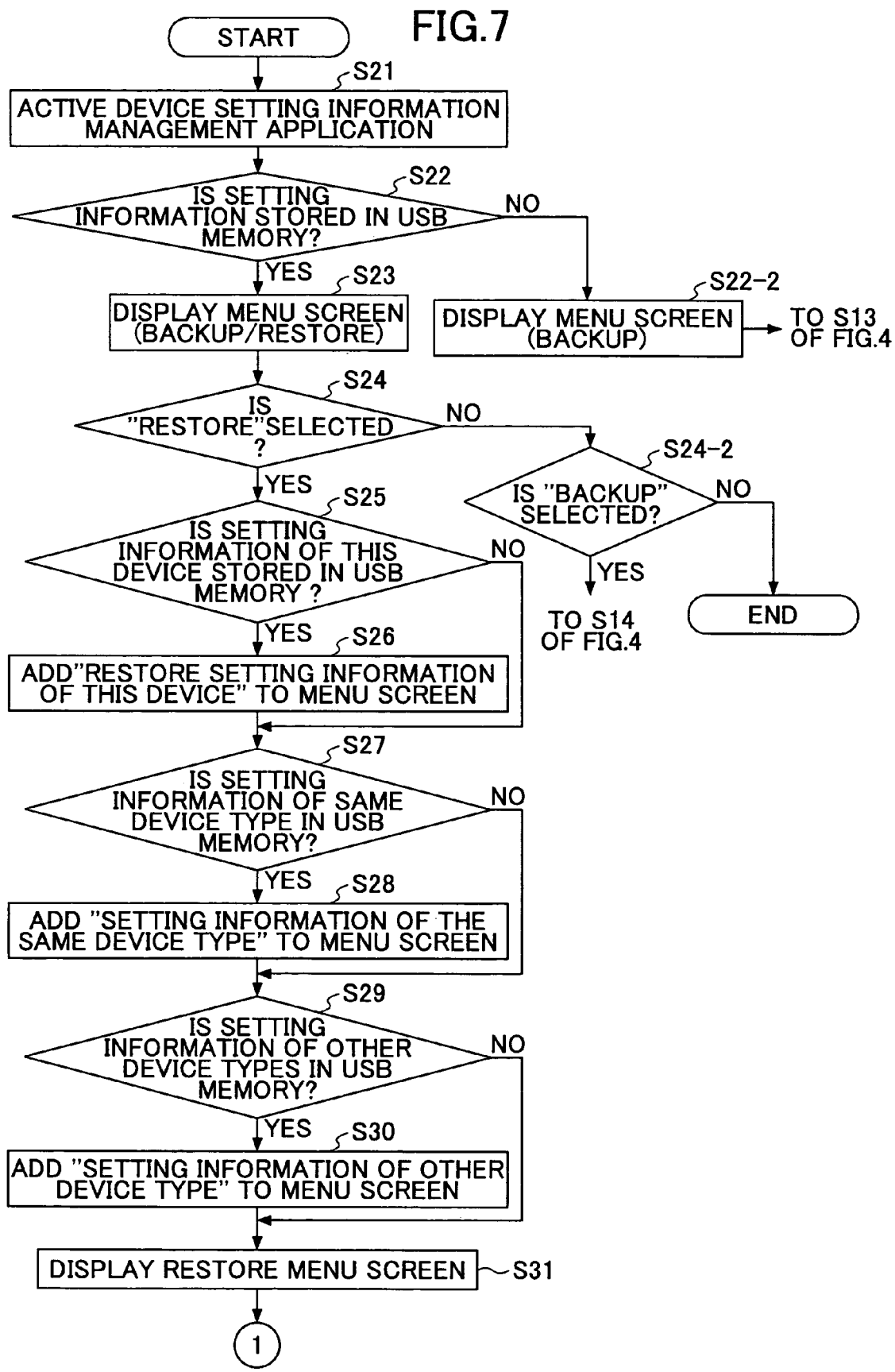
FIG. 7 is a flowchart for explaining a restore process reading the setting information from an external portable recording medium, according to the embodiment of the present invention.
Figure 8:
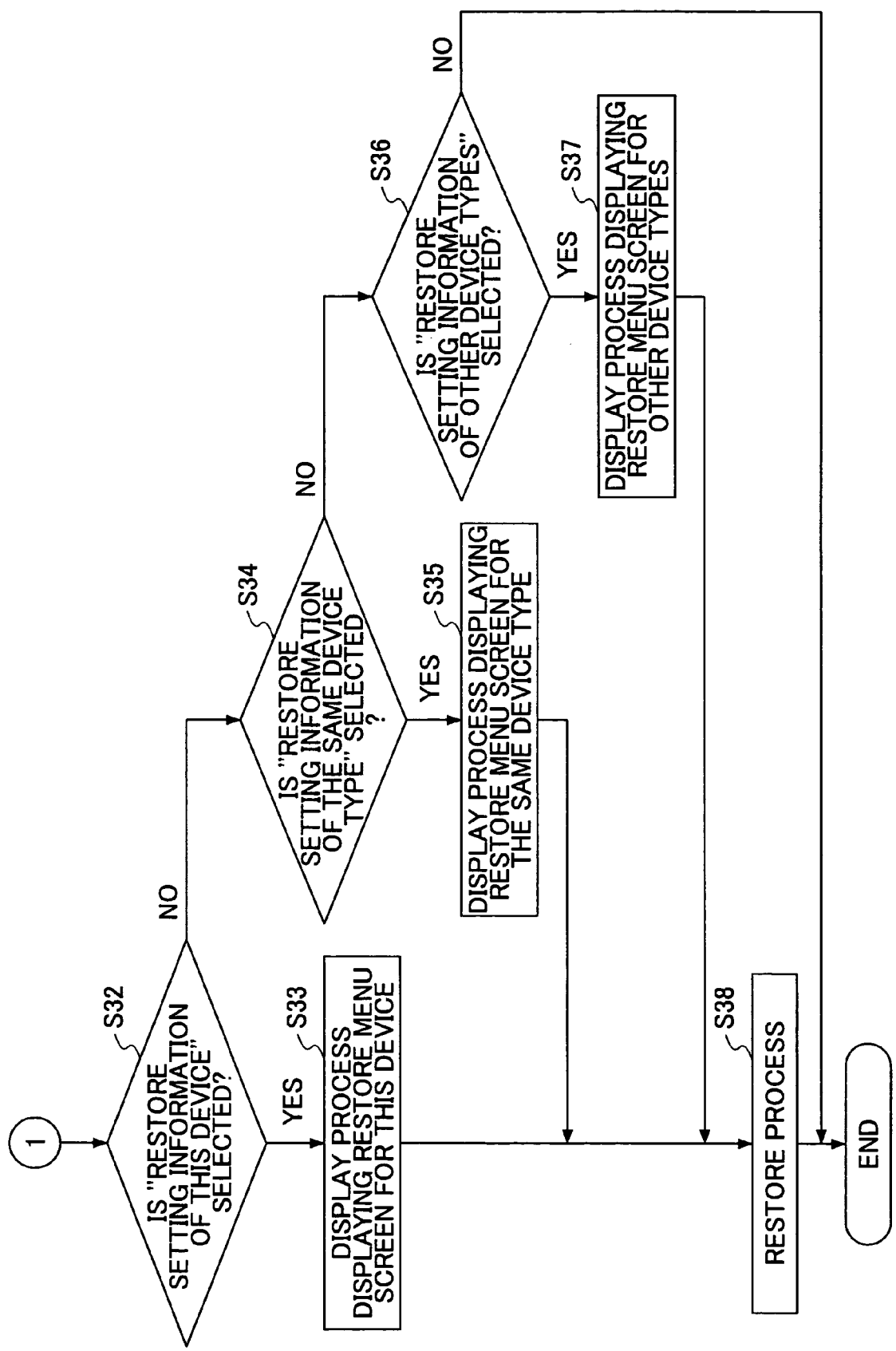
FIG. 8 is flowchart for explaining the restore process reading the setting information from the external portable recording medium, according to the embodiment of the present invention.

Next, the restore process for reading the setting information from the USB memory 14 being the external portable recording medium will be described with reference to FIG. 7 through FIG. 13. FIG. 7 and FIG. 8 are flowcharts for explaining the restore process reading the setting information from the external portable recording medium, according to the embodiment of the present invention.

In FIG. 7, the device setting information management application 20 is activated by a write start instruction of the setting information from the application activating part 55 (step S21), and determines whether or not the setting information is stored in the USB memory 114d (step S22). When the setting information is stored in the USB memory 114d, the device setting information management application 20 displays a menu screen which allows the user to select only the backup shown in FIG. 5 (step S22-2), and conducts a process from the step S13 shown in FIG. 4.

On the other hand, when the setting information is stored in the USB memory 114d, a menu screen allowing the user to select either the backup or the restore is displayed (step S23). The device setting information management application 20 determines whether or not the user selects the restore (step S24). When the user does not select the restore, the device setting information management application 20 determines whether or not the backup is selected (step S24-2). When the backup is selected, the device setting information management application 20 conducts a process from the step S14 in FIG. 4. On the other hand, when the backup is not selected, the device setting information management application 20 terminates the restore process.

In the step S24, when the user selects the restore, the device setting information management application 20 determines whether or not the setting information of the image forming apparatus 1 itself is stored in the USB memory 114d (step S25). The device setting information management application 20 acquires the device ID from the system control service 5a, and determines whether or not the device ID stored in the USB memory 114d is identical to the device ID of the image forming apparatus 1. When the setting information of the image forming apparatus 1 is not stored in the USB memory 114d, the device setting information management application 20 advances to step S27.

On the other hand, when the setting information of the image forming apparatus 1 is stored in the USB memory 114d, the device setting information management application 20 adds a button showing "RESTORE SETTING INFORMATION OF THIS DEVICE" to a restore menu screen (step S26).

The device setting information management application 20 determines whether or not the setting information of the same device type is stored in the USB memory 114d (step S27). The device setting information management application 20 acquires the device ID and the device type from the system control service 5a, and determines whether or not the device type in the USB memory 114d is identical the device type of the image forming apparatus 1 even if the device ID in the USB memory 114d is not identical to the device ID of the image forming apparatus 1. When the setting information of the same device type is not stored in the USB 114d, the device setting information management application 20 advances to step S31.

On the other hand, when the setting information of the same device type as the image forming apparatus 1 is stored in the USB memory 114d, the device setting information management application 20 adds a button showing "RESTORE SETTING INFORMATION OF THE SAME DEVICE TYPE" to the restore menu screen (step S28).

Moreover, the device setting information management application 20 determines whether or not the setting information of other device types is stored in the USB memory 114d (step S29). The device setting information management application 20 acquires the device type from the system control service 5a, and determines whether or not the setting information of a different device type is stored in the USB memory 114d. When the setting information of a different device type is not stored in the USB memory 114d, the device setting information management application 20 advances to step S31.

On the other hand, when the setting information of a different device type is stored in the USB memory 114d, the device setting information management application 20 adds a button showing "RESTORE SETTING INFORMATION OF OTHER DEVICE TYPES" to the restore menu screen (step S30).

After that, the device setting information management application 20 displays the restore menu screen allowing the user to select one of restore types: "RESTORE SETTING INFORMATION OF THIS DEVICE", "RESTORE SETTING INFORMATION OF THE SAME DEVICE TYPE", and "RESTORE SETTING INFORMATION OF OTHER DEVICE TYPES" (step S31).

Subsequently, in FIG. 8, the device setting information management application 20 determines whether or not the user selects "RESTORE SETTING INFORMATION OF THIS DEVICE" (step S32) When the user selects "RESTORE SETTING INFORMATION OF THIS DEVICE", the device setting information management application 20 conducts a display process for displaying a restore menu screen for this device (step S33), conducts the restore process by using the setting information being stored in the USB memory 114d (step S38), and terminates the restore process.

In the step S32, when the user does not select "RESTORE SETTING INFORMATION OF THIS DEVICE", the device setting information management application 20 further determines whether or not the user selects "RESTORE THE SETTING INFORMATION OF THE SAME DEVICE TYPE" (step S34). When the user selects "RESTORE THE SETTING INFORMATION OF THE SAME DEVICE TYPE", the device setting information management application 20 conducts a display process for displaying a restore menu screen for the same device type (step S35), and advances to step S36.

On the other hand, in the step S34, when the user does not select "RESTORE THE SETTING INFORMATION OF THE SAME DEVICE TYPE", the device setting information management application 20 further determines whether or not the user selects "RESTORE THE SETTING INFORMATION OF OTHER DEVICE TYPES" (step S36). When the user selects "RESTORE THE SETTING INFORMATION OF THE SAME DEVICE TYPE", the device setting information management application 20 conducts a display process for displaying a restore menu screen for other device types (step S37), and advances to step S38. On the other hand, when the user does not select "RESTORE THE SETTING INFORMATION OF OTHER DEVICE TYPES", the device setting information management application 20 terminates the restore process.

In step S38, device setting information management application 20 conducts the restore process by using the setting information being stored in the USB memory 114d (step S38), and terminates the restore process.

Figure 9:
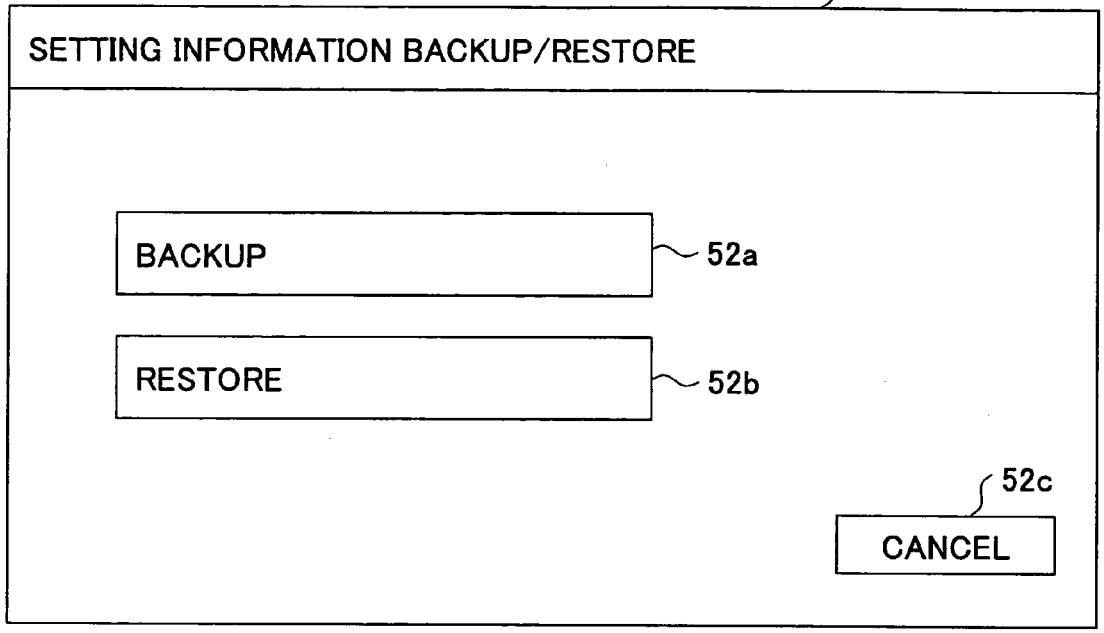
FIG. 9 is a diagram showing an example of the menu screen displayed in the step S23 in FIG. 7, according to the embodiment of the present invention.

FIG. 9 is a diagram showing an example of the menu screen displayed in the step S23 in FIG. 7, according to the embodiment of the present invention. In FIG. 9, a menu screen 52 includes a backup button 52a for conducting the backup of the setting information, a restore button 52b for conducting the restore of the setting information, and a cancel button 52c for canceling both the backup and the restore.

When the user presses the backup button 52a, the device setting information management application 20 conducts the determination process in the step S24-2 in FIG. 7, and advances to the step S14 in FIG. 4. When the user presses the restore button 52b, the device setting information management application 20 conducts the determination process in the step S24 in FIG. 7, and advances to the step S25.

Figure 10:
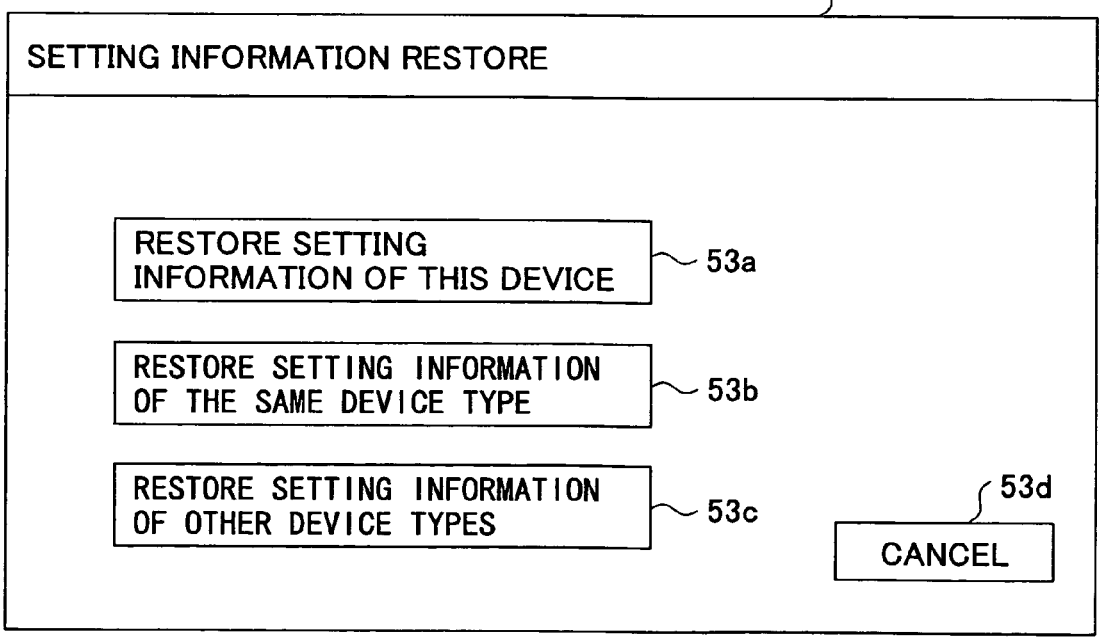
FIG. 10 is a diagram showing an example of the restore menu screen for selecting the restore type displayed in the step S31 in FIG. 7, according to the embodiment of the present invention.

FIG. 10 is a diagram showing an example of the restore menu screen for selecting the restore type displayed in the step S31 in FIG. 7, according to the embodiment of the present invention. In FIG. 10, a restore menu screen 53 is a menu screen for selecting one of a plurality of the restore types, and includes a button 53a for restoring the setting information of the image forming apparatus 1, a button 53b for restoring the setting information of the same device type, a button 53c for restoring the setting information of other device types, and a cancel button 53d for canceling the restore.

When the user presses the button 53a, the device setting information management application 20 conducts the step 33 in FIG. 8, and displays a screen for selecting the setting information of the image forming apparatus 1 at the operation panel 113. When the user presses the button 53b, the device setting information management application 20 conducts the step S35 in FIG. 8, and displays a screen for selecting the setting information of the same device type. When the user presses the button 53c, the device setting information management application 20 conducts the step S37 in FIG. 8, and displays a screen for setting the setting information of other device types at the operation panel 113.

Figure 11:
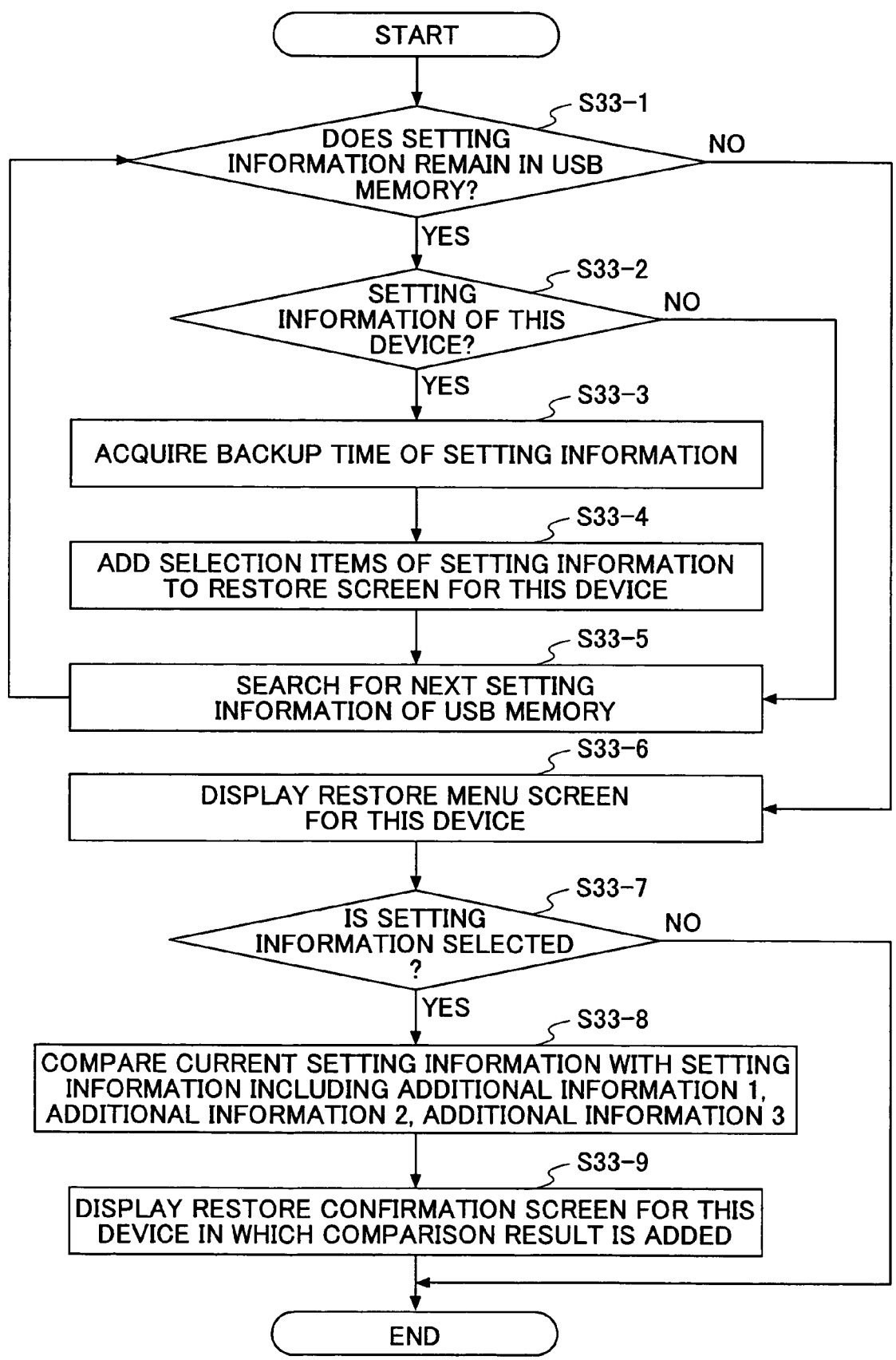
FIG. 11 is flowchart for explaining the display process of the restore menu for this device conducted in the step S33 in FIG. 8, according to the embodiment of the present invention.

FIG. 11 is flowchart for explaining the display process of the restore menu for this device conducted in the step S33 in FIG. 8, according to the embodiment of the present invention. In FIG. 11, the device setting information management application 20 determines whether or not the setting information remains in the USB memory 114d (step S33-1). When the setting information does not remain in the USB memory 114d, the device setting information management application 20 displays the restore menu screen for this device (step S33-6), and terminates the process in the step S33.

On the other hand, when the setting information remains in the USB memory 114d, the device setting information management application 20 further determines whether or not the setting information being stored in the USB memory 114d is the setting information of the image forming apparatus 1 (step S33-2). When the setting information being stored in the USB memory 114d is not the setting information of the image forming apparatus 1, the device setting information management application 20 advances to step S33-5.

On the other hand, when the setting information being stored in the USB memory 114d is the setting information of the image forming apparatus 1, the device setting information management application 20 acquires a backup time of the setting information from the USB memory 114d (step S33-3), and adds as selections items of the setting information at the restore screen for this device (step S33-4). After that, the device setting information management application 20 searches for next setting information from the USB memory 114d (step S33-5), and is back to the step S33-3 to repeat the above process.

In the step S33-1, when it is determined that the setting information does not remain in the USB memory 114d, the device setting information management application 20 displays the restore menu screen for this device to which setting items of the setting information are added, at the operation panel 113 (step S33-6).

The device setting information management application 20 determines whether or not the setting items are selected from the restore menu screen for this device displayed at the operation panel 113 (step S33-7). When the setting item is not selected and the restore is cancelled, the device setting information management application 20 terminates the process in the step S33 in FIG. 8.

On the other hand, when the setting items are selected, the device setting information management application 20 compares the setting information to which the additional information 1, the additional information 2, and the additional information 3 are added, with the current setting information of the image forming apparatus 1 (step S33-8), displays a restore confirmation screen for this device to which the comparison result is added (step S33-9), and terminates the process in the step S33 in FIG. 8.

Figure 12:
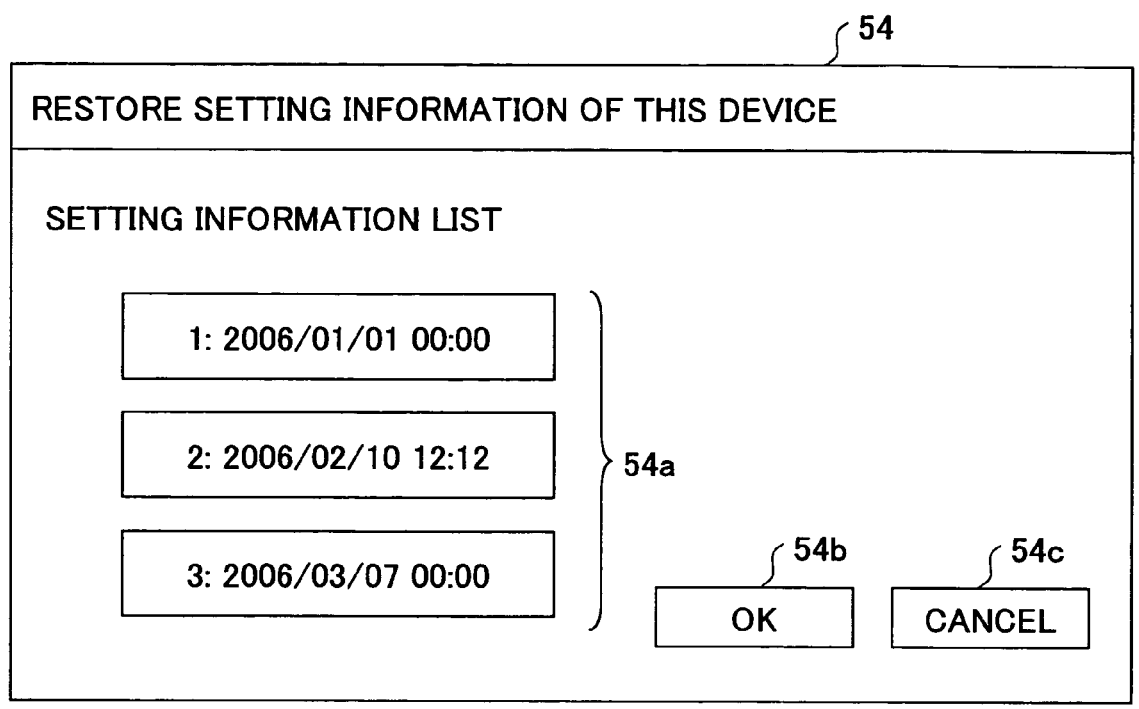
FIG. 12 is a diagram showing an example of the restore menu screen for this device displayed in the step S33-6 in FIG. 11, according to the embodiment of the present invention.

FIG. 12 is a diagram showing an example of the restore menu screen for this device displayed in the step S33-6 in FIG. 11, according to the embodiment of the present invention. In FIG. 12, a restore menu screen 54 is a screen showing a list of the setting information which is backed up from the image forming apparatus 1, and includes a display area 54a for displaying the list of the setting information which the user can select, and an OK button 54b for restoring the setting information selected by the user to the image forming apparatus 1, and a cancel button 54c for canceling the restore.

For example, the display area 54a displays the list of the sets of the setting information and date and time of the backup by a selection button showing "1:2006/01/01 00:00", a selection button showing "2:2006/02/10 12:12", and a selection button showing "3:2006/03/07 00:00".

When the user selects desired setting information by pressing the selection button showing "3:2006/03/07 00:00" from the display area 54a, a confirmation screen 55 as shown in FIG. 13 is displayed at the operation panel 113.

FIG. 13 is a diagram showing the confirmation screen for restoring the setting information of the image forming apparatus according to the embodiment of the present invention. In FIG. 13, the confirmation screen 55 is a screen for confirming the restore of the setting information selected by the user, and includes a display area 55a for displaying selection items of the setting information selected by the user, a display area 55b for displaying a comparison result of the setting information, an OK button 55f for restoring the setting information, and a cancel button 55g for canceling the restore of the setting information selected by the user.

The display area 55b for displaying the comparison result of the setting information displays the setting items of the setting information to which the additional information 1, the additional information 2, and the additional information 3 are added. That is, the display area 55b displays the setting items which can be shared among the different device types, the setting items which can be shared among the different apparatuses being the same device type, and the setting items which cannot be shared among the different devices. In the display area 55b, the user is allowed to determine whether or not to restore the setting items of the setting information.

The user restores the setting information displayed in the display area 55b by selecting the setting items to be replaced and restored and clicking the OK button 55f.

Figure 14:
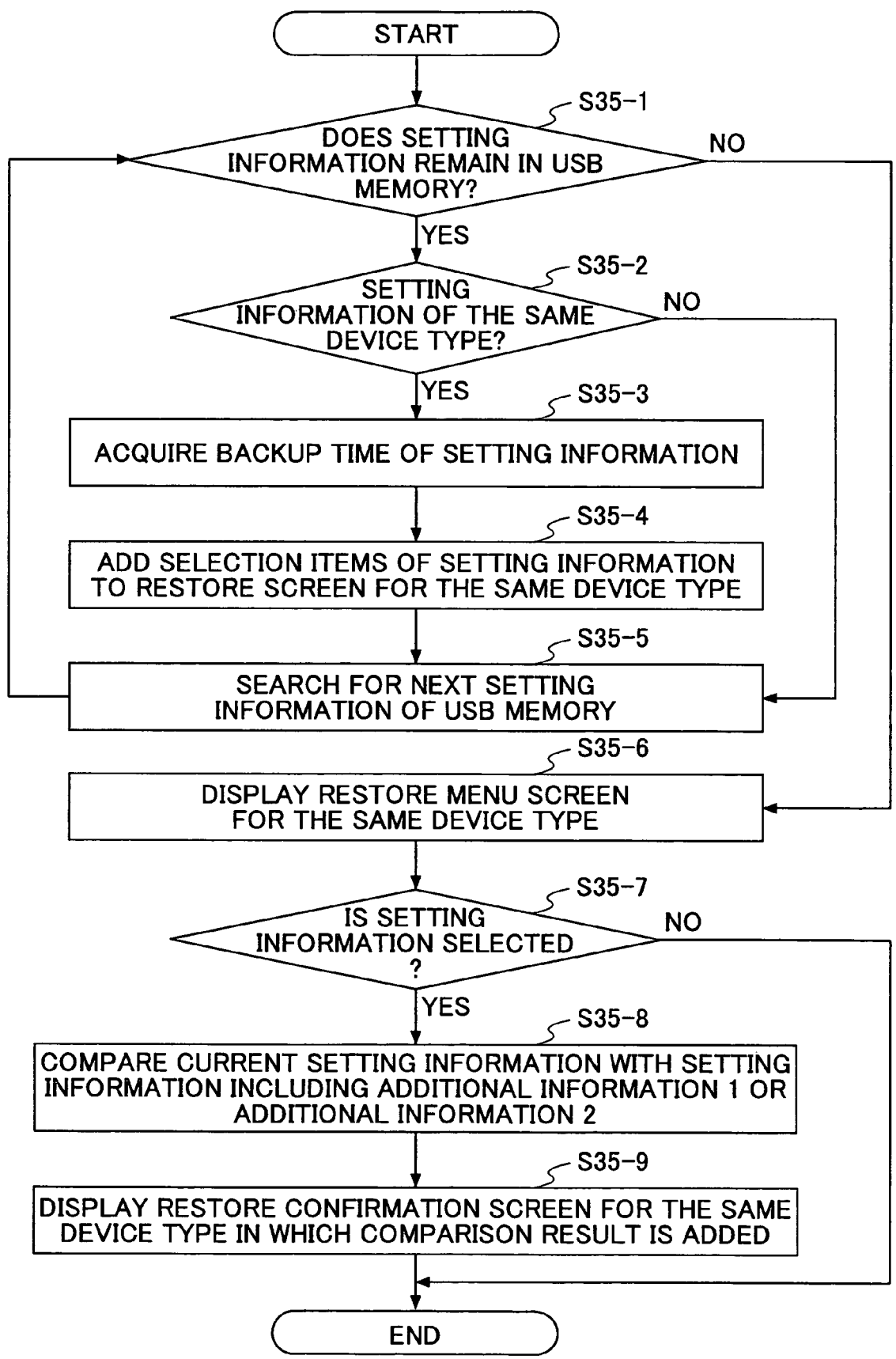
FIG. 14 is a flowchart for explaining the display process of the restore menu screen for the same device type conducted in the step S35 in FIG. 8, according to the embodiment of the present invention.

FIG. 14 is a flowchart for explaining the display process of the restore menu screen for the same device type conducted in the step S35 in FIG. 8, according to the embodiment of the present invention. In FIG. 14, the device setting information management application 20 determines whether or not the setting information remains in the USB memory 114d (step S35-1). When the setting information does not remain in the USB memory 114d, the device setting information management application 20 displays the restore menu screen for the same device type (step S35-6), and terminates the process in the step S35.

On the other hand, when the setting information remains in the USB memory 114d, the device setting information management application 20 further determines whether or not the device type of the setting information stored in the USB memory 114d is the same as the device type of the image forming application 1 (step S35-2). When the device type of the setting information stored in the USB memory 114d is not the same as the device type of the image forming application 1, the device setting information management application 20 advances to step S35-5.

On the other hand, when the setting information is the setting information of the image forming apparatus 1, the device setting information management application 20 acquires the backup time of the setting information from the USB memory 114d (step S35-3), and adds the backup time as the selection item of the setting information to the restore screen for the same device (step S35-4). Subsequently, the device setting information management application 20 searches for next setting information from the USB memory 114d (step S35-5), and goes back to the step S35-1 to repeat the above-described processes.

In the step S35-1, when it is determined that the setting information does not remain in the USB memory 114d, the device setting information management application 20 displays the restore menu screen for the same device to which all sets of the setting information are added as selectable buttons at the operation panel 113 (step S35-6).

The device setting information management application 20 determines whether or not the setting information is selected by the user from the restore menu screen for the same device type displayed at the operation panel 113 (S35-7). When the user cancels without selecting the setting information, the device setting information management application 20 terminates the process in the step S35 in FIG. 8.

On the other hand, when the setting information is selected, the device setting information management application 20 compares the setting information in which the additional information 1 and the additional information 2 are set, with the current setting information (step S35-8), displays the restore confirmation screen for the same device type to which the comparison result is added (step S35-9), and terminates the process in step S35 in FIG. 8.

Figure 15:
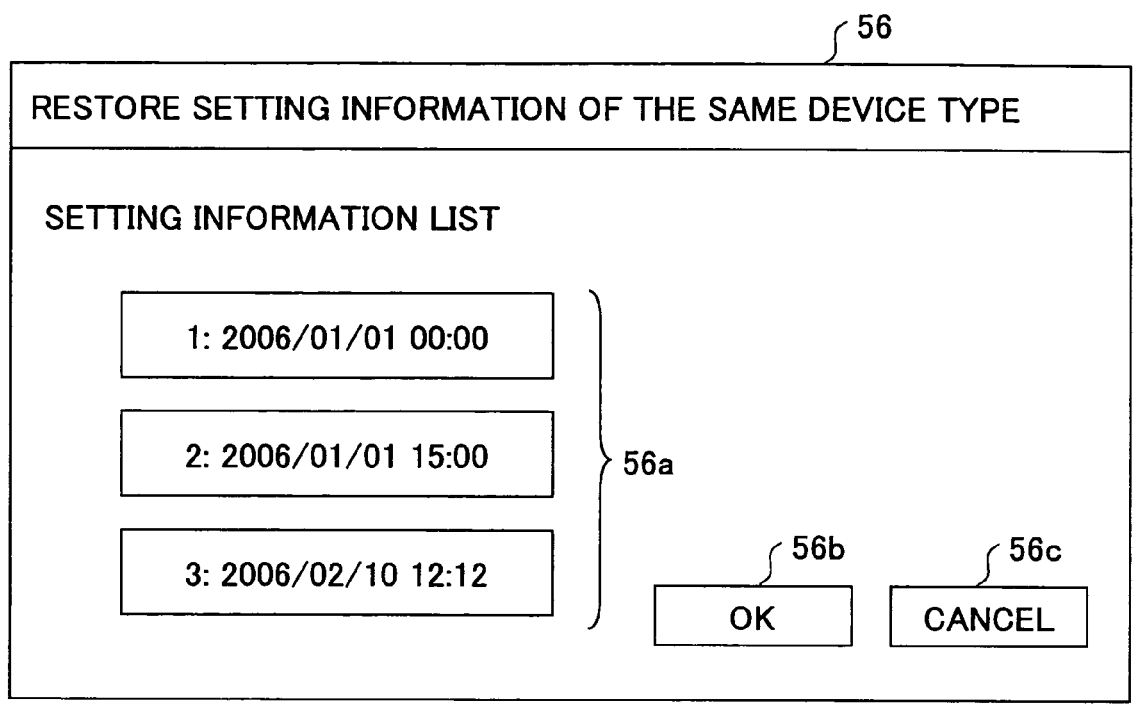
FIG. 15 is a diagram showing an example of the restore menu screen for the same device type displayed in the step S35-6 in FIG. 14, according to the embodiment of the present invention.

FIG. 15 is a diagram showing an example of the restore menu screen for the same device type displayed in the step S35-6 in FIG. 14, according to the embodiment of the present invention. In FIG. 15, the restore menu screen 56 is a screen showing a list of sets of the setting information, which are backed up from other image forming apparatuses being the same device type as the image forming apparatus 1, and includes a display area 56a for displaying a list of the sets of the setting information which can be selected by the user, an OK button 56b for restoring the setting information selected by the user to the image forming apparatus 1, and a cancel button 56c for canceling the restore.

For example, the display area 56a displays the list of the sets of the setting information and date and time of the backup by using a selection button showing "1:2006/01/01 00:00", a selection button showing "2:2006/01/01 15:00", and a selection button showing "3:2006/02/10 12:12".

Figure 16:
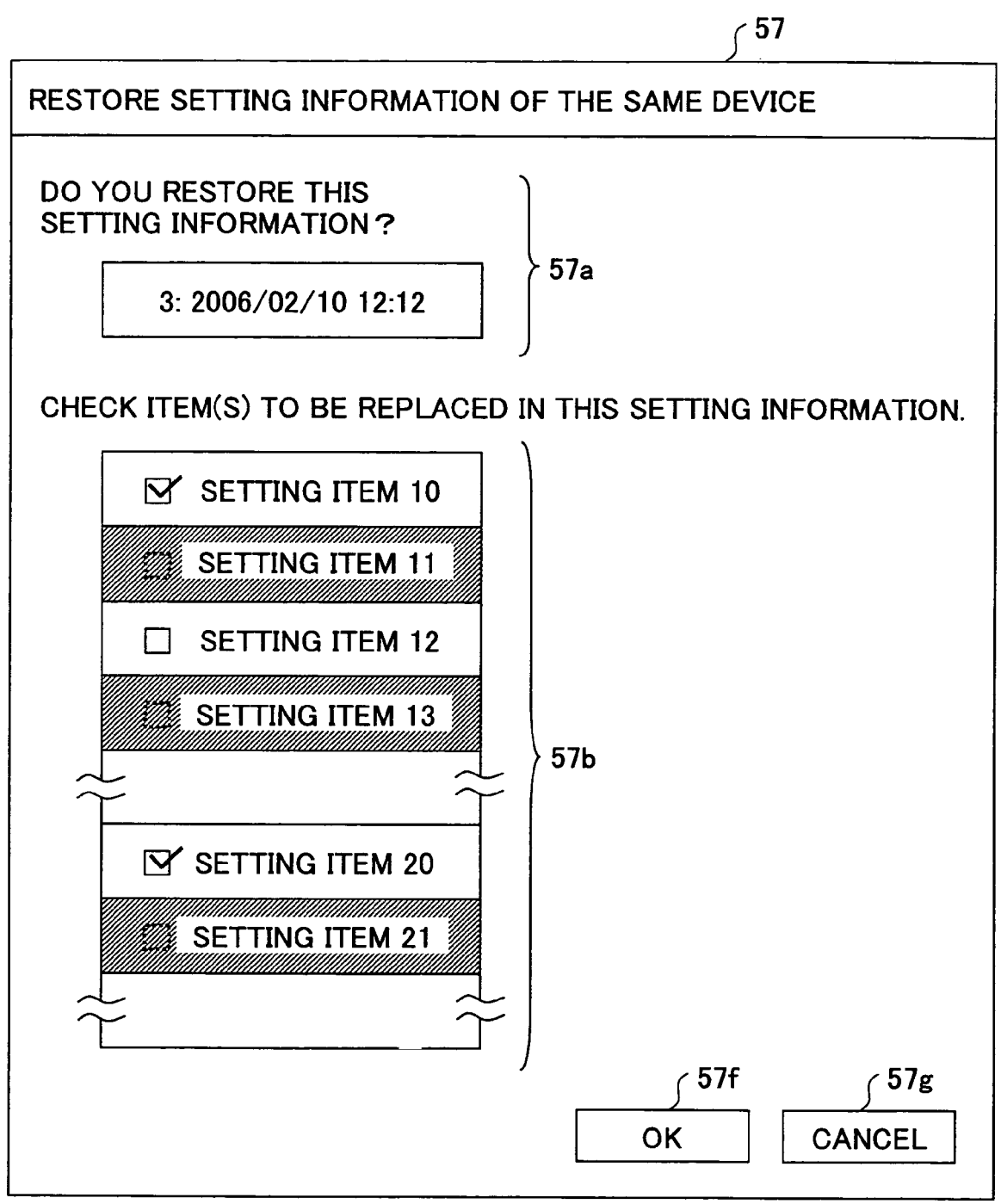
FIG. 16 is a diagram showing the confirmation screen for restoring the setting information of the same device type to the image forming apparatus according to the embodiment of the present invention.

When the user selects desired setting information by pressing the selection button showing "3:2006/02/10 12:12" from the display area 56a and pressing the OK button 56b, a confirmation screen 57 as shown in FIG. 16 is displayed at the operation panel 113.

FIG. 16 is a diagram showing the confirmation screen for restoring the setting information of the same device type to the image forming apparatus according to the embodiment of the present invention. In FIG. 16, the confirmation screen 57 is a screen for confirming the restore of the setting information selected by the user, and includes a display area 57a for displaying selection items of the setting information selected by the user, a display area 57b for displaying a comparison result of the setting information, an OK button 57f for restoring the setting information, and a cancel button 57g for canceling the restore of the setting information selected by the user.

The display area 57b for displaying the comparison result of the setting information displays the setting items of the setting information including the additional information 1 and the additional information 2 which are subjects to be compared in the step S35-8. That is, the display area 57b displays the setting items which can be shared among the different device types, and the setting items which can be shared among the different apparatuses being the same device type. In the display area 57b, the user is allowed to determine whether or not to restore the setting items of the setting information. However, in the display area 57b, the setting items, which are included in the setting information displayed in the display area 57*a* but are not included in the image forming apparatus 1, are displayed in gray and suppressed to select.

The user restores the setting information displayed in the display area 57*a* by selecting the setting items to be replaced and restored and clicking the OK button 57*f*.

Figure 17:
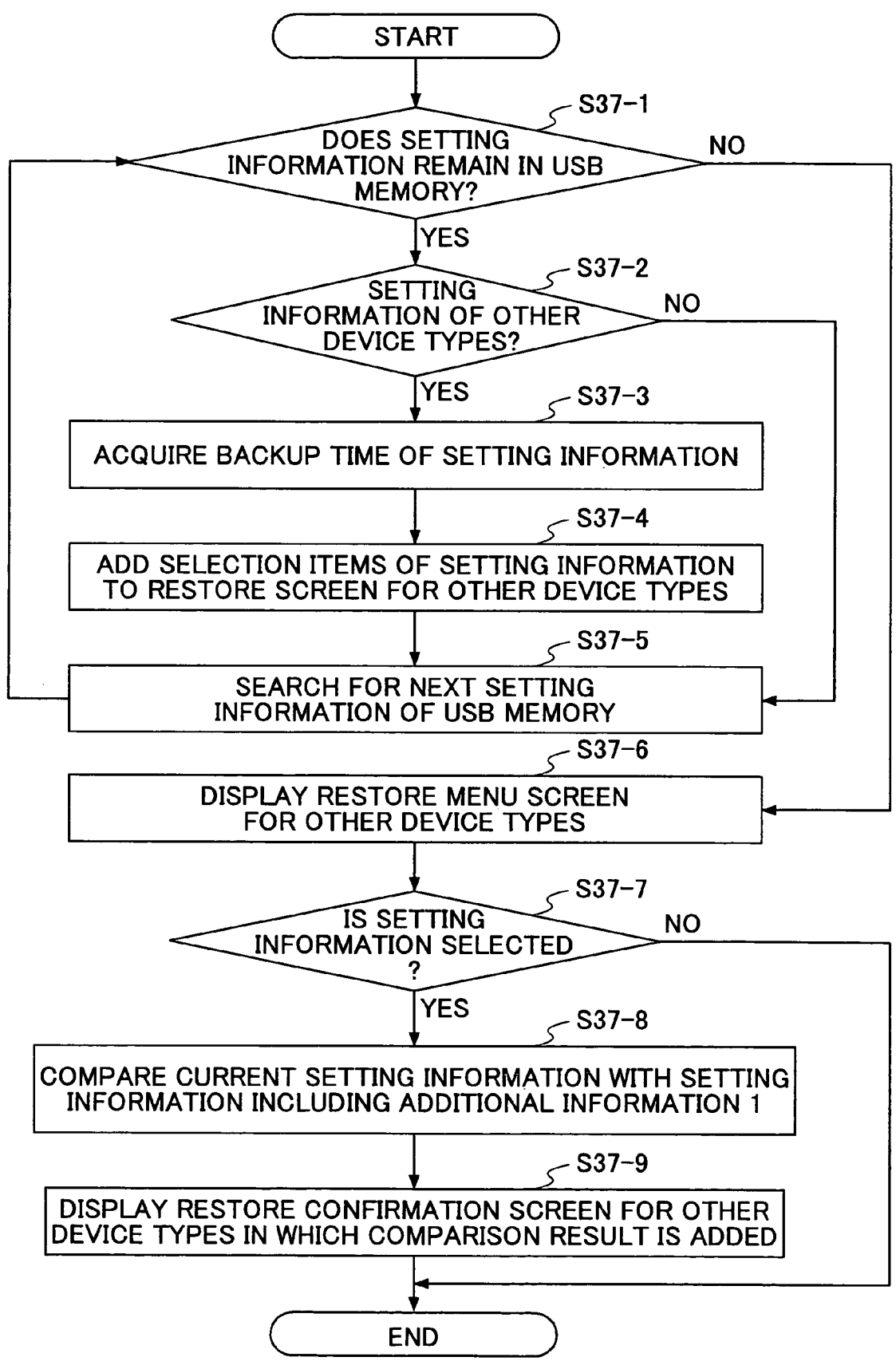
FIG. 17 is a flowchart for explaining the display process of the restore menu screen for the same device type conducted in the step S37 in FIG. 8, according to the embodiment of the present invention.

FIG. 17 is a flowchart for explaining the display process of the restore menu screen for the same device type conducted in the step S37 in FIG. 8, according to the embodiment of the present invention. In FIG. 17, the device setting information management application 20 determines whether or not the setting information remains in the USB memory 114*d* (step S37-1). When the setting information does not remain in the USB memory 114*d*, the device setting information management application 20 displays the restore menu screen for the same device type (step S37-6), and terminates the process in the step S37.

On the other hand, when the setting information remains in the USB memory 114*d*, the device setting information management applicator 20 further determines whether or not the device type of the setting information stored in the USB memory 114*d* is one of the other device types different from the device type of the image forming apparatus 1 (step S37-2). When the device type of the setting information stored in the USB memory 114*d* is not one of the other device types different from the device type of the image forming apparatus 1, the device setting information management application 20 advances to step S37-5.

On the other hand, when the setting information is the setting information of the other device types, the device setting information management application 20 acquires the backup time of the setting information from the USB memory 114*d* (step S37-3), adds the backup time as the selection item of the setting information to the restore screen for the same device (step S37-4). Subsequently, the device setting information management application 20 searches for next setting information from the USB memory 114*d* (step S37-5), and goes back to the step S37-1 to repeat the above-described processes.

In the step S37-1, when it is determined that the setting information does not remain in the USB memory 114*d*, the device setting information management application 20 displays the restore menu screen for the other device types to which all sets of the setting information are added as selectable buttons at the operation panel 113 (step S37-6).

The device setting information management application 20 determines whether or not the setting information is selected by the user from the restore menu screen for the other device types displayed at the operation panel 113 (S37-7). When the user cancels without selecting the setting information, the device setting information management application 20 terminates the process in the step S37 in FIG. 8.

On the other hand, when the setting information is selected, the device setting information management application 20 compares the setting information in which the additional information 1, with the current setting information (step S37-8), displays the restore confirmation screen for the same device to which the comparison result is added (step S37-9), and terminates the process in step S37 in FIG. 8.

Figure 18:
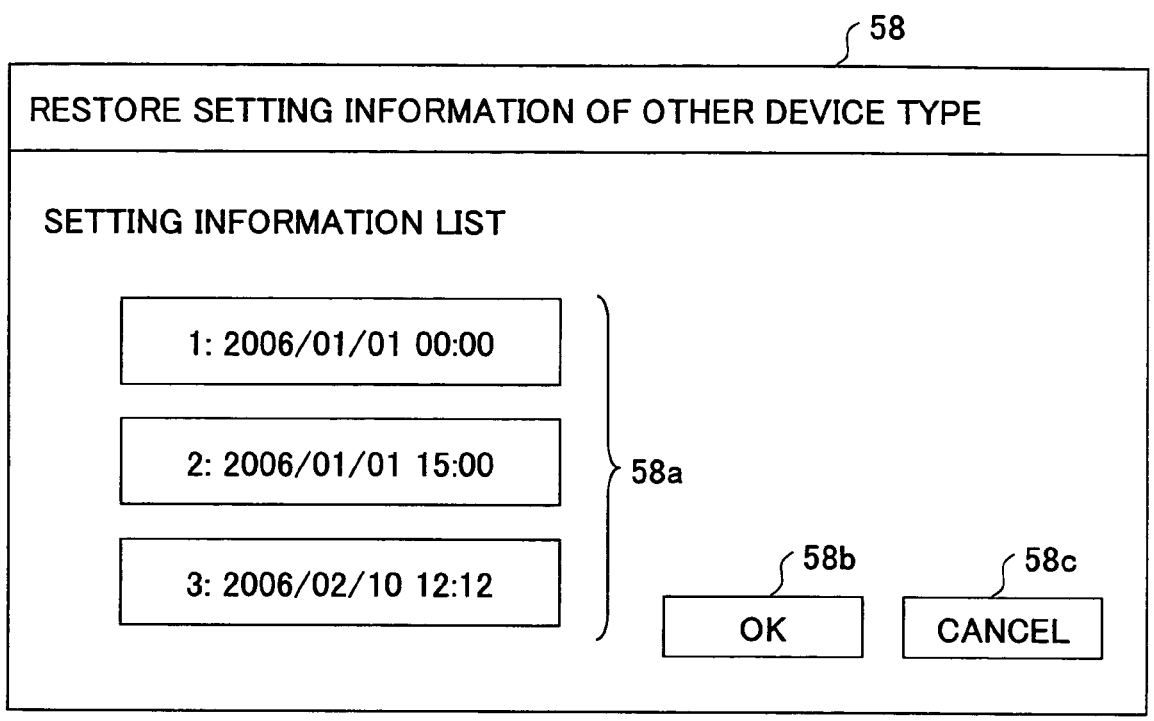
FIG. 18 is a diagram showing an example of the restore menu screen for the same device type displayed in the step S37-6 in FIG. 14, according to the embodiment of the present invention.

FIG. 18 is a diagram showing an example of the restore menu screen for the same device type displayed in the step S37-6 in FIG. 14, according to the embodiment of the present invention. In FIG. 18, the restore menu screen 58 is a screen showing a list of sets of the setting information, which are backed up from other image forming apparatuses being the same device type as the image forming apparatus 1, and includes a display area 58*a* for displaying a list of the sets of the setting information which can be selected by the user, an OK button 58*b* for restoring the setting information selected by the user to the image forming apparatus 1, and a cancel button 58*c* for canceling the restore.

Similar to the restore menu screen 56, the display area 58*a* of the restore menu screen 58 displays the list of the sets of the setting information and date and time of the backup by using selection buttons.

Figure 19:
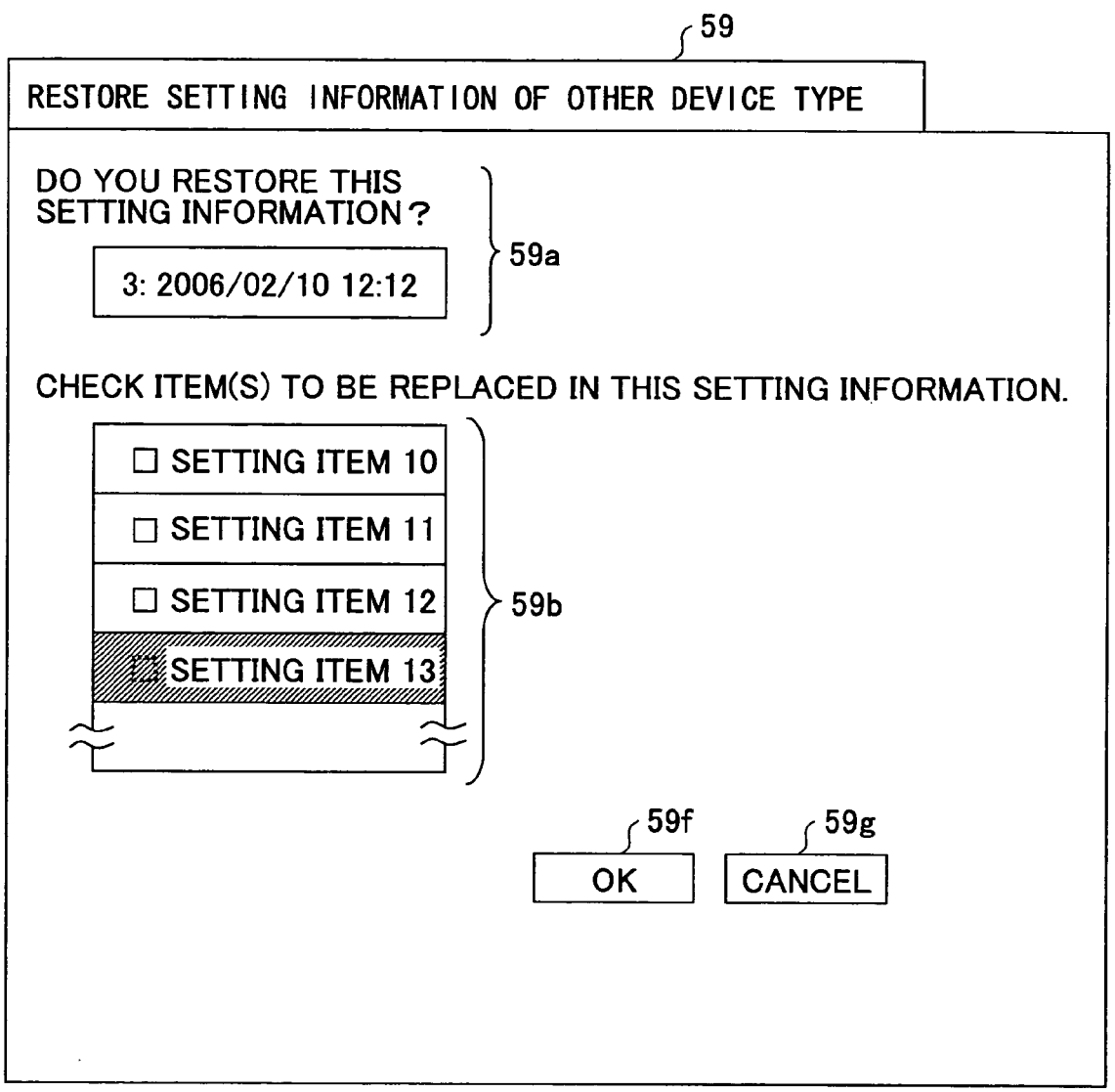
FIG. 19 is a diagram showing the confirmation screen for restoring the setting information of the other device types to the image forming apparatus according to the embodiment of the present invention.

When the user selects desired setting information by pressing the selection button showing "3:2006/02/10 12:12" from the display area 58*a* and pressing the OK button 58*b*, a confirmation screen 59 as shown in FIG. 19 is displayed at the operation panel 113.

FIG. 19 is a diagram showing the confirmation screen for restoring the setting information of the other device types to the image forming apparatus according to the embodiment of the present invention. In FIG. 19, the confirmation screen 59 is a screen for confirming the restore of the setting information selected by the user, and includes a display area 59*a* for displaying selection items of the setting information selected by the user, a display area 59*b* for displaying a comparison result of the setting information, an OK button 59*f* for restoring the setting information, and a cancel button 59*g* for canceling the restore of the setting information selected by the user.

The display area 59*b* for displaying the comparison result of the setting information displays the setting items of the setting information including the additional information 1 which is a subject to be compared in the step S37-8. That is, the display area 59*b* displays the setting items which can be shared among the different device types. In the display area 59*b*, the user is allowed to determine whether or not to restore the setting items of the setting information. However, in the display area 59*b*, the setting items, which are included in the setting information displayed in the display area 59*a* but are not included in the image forming apparatus 1, are displayed in gray and suppressed to select.

Figure 20:
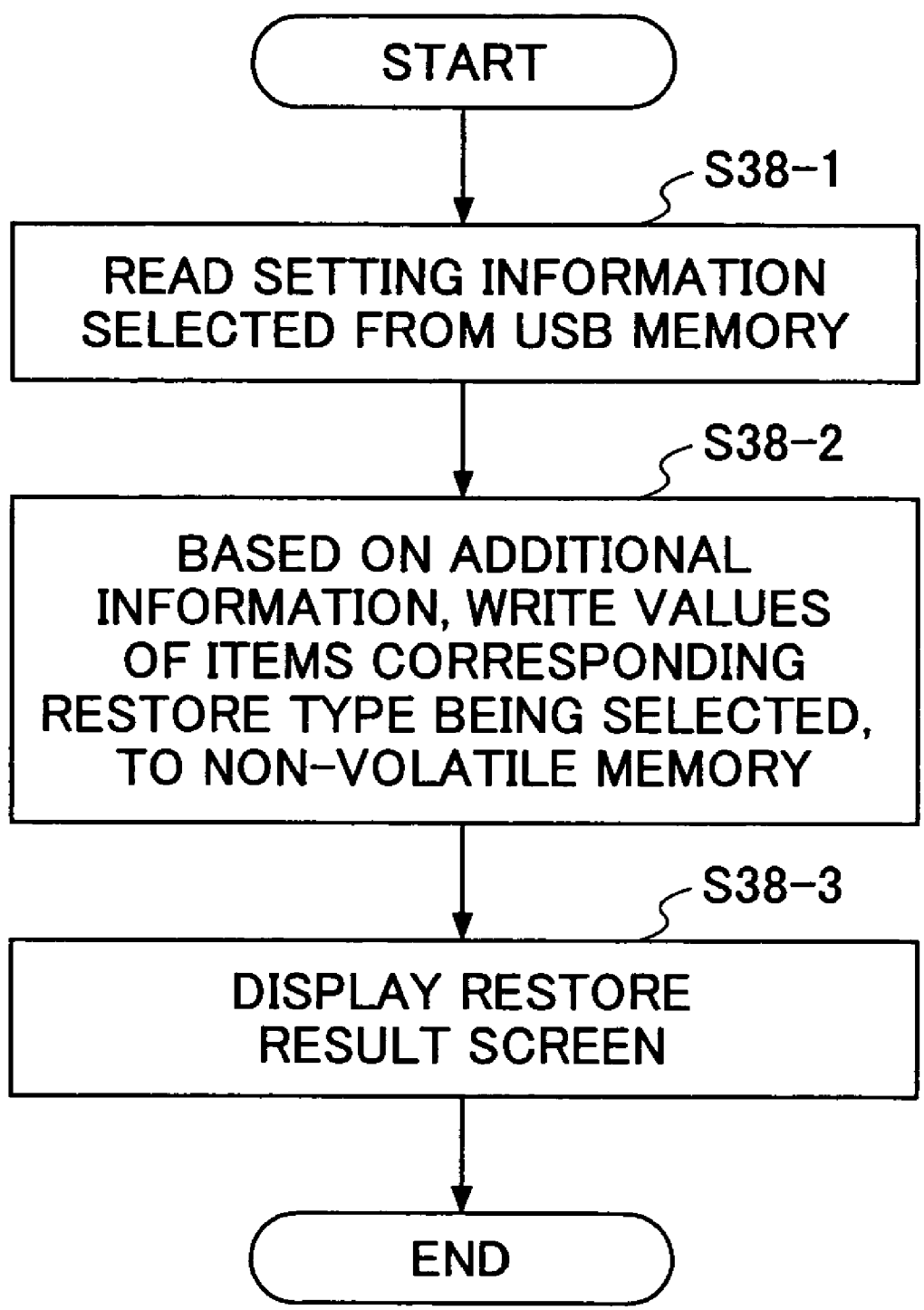
FIG. 20 is a flowchart for explaining the restore process conducted in the step S38 in FIG. 8, according to the embodiment of the present invention.

FIG. 20 is a flowchart for explaining the restore process conducted in the step S38 in FIG. 8, according to the embodiment of the present invention. In FIG. 20, the device setting information management application 20 reads out the setting information selected by the user from the USB memory 114*d* (step S38-1), and writes values of the setting items of the setting information to be shared in common based on the additional information 1 through 3 and the restore type selected from "RESTORE SETTING INFORMATION OF THIS DEVICE", "RESTORE SETTING INFORMATION OF THE SAME DEVICE TYPE", and "RESTORE SETTING INFORMATION OF OTHER DEVICE TYPES", to a non-volatile memory mounted in the image forming apparatus 1 (step S38-2). The device setting information management application 20 displays a restore result screen (step S38-3), and terminates the restore process. In the restore result screen, for example, a message such as "Restore has been completed" is displayed so as to inform the user an end of the restore process.

In the above-described embodiment, each of functions implemented in the image forming apparatus 1 can be programmed, and may be recorded in a recording medium such as a CD-ROM (Compact Disk Read Only Memory). The CD-ROM is inserted into a medium driving device such as a CD-ROM drive mounted in a computer, and the programs of the functions can be loaded to a storage unit of the computer. Then, the present invention can be achieved by executing the program.

Moreover, the program read out from the recording medium can realize the functions described in the embodiment. Thus, the program and the recording medium recorded with the program can realize a configuration of the present invention as describe above.

As the recording medium to store the program, a semiconductor recording medium (for example, a ROM (Read-Only Memory, a non-volatile memory, and a like), an optical recording medium (for example, a DVD (Digital Versatile Disk), an MO (Magneto-Optical disk), an MD (Mini-Disk), a CD (Compact Disk), and a like), a magnetic medium (for example, a magnetic tape, a flexible disk, and a like) can be used.

According to the present invention, first, by recording the setting information of the image forming apparatus 1 to the portable recording medium, it is possible to back up the setting information.

Second, by recording group information specifying a group to which the image forming apparatus 1 belongs, it is possible to specify desired setting information. The group information may be information specifying the device type.

Third, by recording the setting information with unique information assigned to the image forming apparatus 1, it is possible to specify the desired setting information. The unique information may be the device ID of the image forming apparatus 1.

Fourth, by recording the setting information with a recorded time, it is possible to specify the setting information.

Fifth, by adding additional information indicating whether or not a setting item can be used in common among other image forming apparatuses for each setting item of the setting information, it is possible to safely restore the setting information of the backup to other image forming apparatuses. In particular, it is effective when the setting information of a new device type is restored to another image forming apparatus being an old device type.

Sixth, by adding first additional information indicating whether or not the setting item can be used in common among different device types, second additional information indicating whether or not the setting item can be used in common among different devices being the same device type, and third additional information indicating whether or not the setting item is prohibited to be set in common among different devices, as additional information, it is possible to restore the setting items of the setting information which can be set in common in consideration of different device types when the setting information being backed up is restored to other image forming apparatuses 1.

Seventh, the image forming apparatus 1 may include a comparison displaying part for displaying a comparison result from comparing the setting information being stored in a storage unit internally mounted in the image forming apparatus 1 with the setting information being written in the portable recording medium at the operation panel 113. Therefore, it is possible for the user to easily determine a necessity of the backup of the setting information.

Eighth, by storing the setting information converted into the shell command format to the USB memory 114*d*, it is possible to easily restore the setting information by directly transmitting a shell command of the setting information stored in the USB memory 114*d* connected to the PC 3 to the image forming apparatus 1 through the network 2.

Ninth, by storing the setting information converted into the PJL format to the USB memory 114*d*, it is possible to easily restore the setting information by the parallel connection between the PC 3 and the image forming apparatus 1, by directly sending a PJL of the setting information stored in the USB memory 114*d* connected to the PC 3 to the image forming apparatus 1.

Tenth, the image forming apparatus 1 may mount a reading part for reading a plurality of sets of the setting information stored in the portable recording medium, and a part for determining whether or not to write the setting information read out by the reading part too the storage unit internally mounted in the image forming apparatus 1. It is possible to restore the backup of the setting information in the portable recording medium to a proper image forming apparatus.

Eleventh, by writing the setting information, of which the device type is identical to the device type of the information apparatus 1, to the storage unit in the image forming apparatus, it is possible to prevent from restoring wrong setting information to the storage unit of the information apparatus 1.

Moreover, by writing the setting information, of which the unique information is identical to the unique information assigned to the image forming apparatus 1, to the storage unit in the image forming apparatus 1, it is possible to prevent from restoring the wrong setting information to the information apparatus 1.

Furthermore, by writing the setting information, of which the device type or the unique information is identical to the device type or the unique information of the image forming apparatus 1, to the storage unit in the image forming apparatus 1, it is possible to prevent from restoring the wrong setting information to the information apparatus 1.

Twelfth, by displaying the user only the setting information of which the device type is identical to the device type of the image forming apparatus 1, it is possible to prevent from restoring the wrong setting information to the information apparatus 1.

Thirteenth, by displaying the user only the setting information of which the unique information is identical to the unique information assigned to the image forming apparatus 1, it is possible to prevent from restoring the wrong setting information to the information apparatus 1.

Fourteenth, by displaying the user only the setting information of which the device type or the unique information is identical to the device type or the unique information of the image forming apparatus 1, it is possible to prevent from restoring the wrong setting information to the information apparatus 1.

Fifteenth, by writing the setting items used in common based on the additional information, which is set for each setting item of the setting information and indicates whether or not the setting item can be used in common among other image forming apparatus, it is possible to safely restore the backup of the setting information to the other image forming apparatuses. In particular, it is effective to restore the setting information backed up from the new device type to the old device type.

Sixteenth, by adding first additional information indicating whether or not the setting item can be used in common among different device types, second additional information indicating whether or not the setting item can be used in common among different devices being the same device type, and third additional information indicating whether or not the setting item is prohibited to be set in common among different devices, as additional information, it is possible to restore the setting items of the setting information which can be set in common in consideration of different device types when the setting information being backed up is restored to other image forming apparatuses 1.

Seventeenth, the image forming apparatus 1 may include a part for allowing the user to determine whether or not to record the setting information of the image forming apparatus 1 to the portable recording medium. Accordingly, it is possible to back up the setting information of the image forming apparatus 1 to the portable recording medium when the user desires to back up the setting information.

Eighteenth, by displaying the comparison result from comparing the setting information stored in the storage unit internally mounted in the image forming apparatus 1 with the setting information written in the portable recording medium when the setting information is backed up, it is possible for the user to easily determine a necessity of backing up the setting information.

Nineteenth, by displaying the comparison result from comparing the setting information stored in the storage unit internally mounted in the image forming apparatus 1 with the setting information written in the portable recording medium when the setting information is restored up, it is possible for the user to easily determine a necessity of restoring the setting information.

The present invention is not limited to the specifically disclosed embodiments, and variations and modifications may be made without departing from the scope of the present invention.

The present application is based on the Japanese Priority Applications No. 2005-290132 filed on Oct. 3, 2005 and No. 2006-202441 filed on Jul. 25, 2006, the entire contents of which are hereby incorporated by reference.

What is claimed is:

1. An image forming apparatus, comprising:
an interface detachably connecting a portable recording medium; and
a first writing part writing setting information stored in a storage unit internally mounted in the image forming apparatus to the portable recording medium with identification information of the image forming apparatus, wherein the first writing part adds additional information indicating whether or not a setting item can be used in common among other image forming apparatuses for each setting item of the setting information when writing the setting information to the portable recording medium.

2. The image forming apparatus as claimed in claim 1, wherein the identification information is information for identifying a group to which the image forming apparatus belongs.

3. The image forming apparatus as claimed in claim 1, wherein the identification information is unique information assigned to the image forming apparatus.

4. The image forming apparatus as claimed in claim 1, wherein the first writing part acquires a time of writing the setting information from a time acquisition part mounted in the image forming apparatus, and writes the setting information with the identification information of the image forming apparatus and the time as a recorded time to the portable recording medium.

5. The image forming apparatus as claimed in claim 1, wherein as the additional information, the first writing part adds a first additional information indicating whether or not the setting item can be set in common among different device types, a second additional information indicating whether or not the setting item can be set in common among different devices being the same device type as the image forming apparatus, and a third additional information indicating whether or not the setting item is prohibited to be set in common among the different devices.

6. The image forming apparatus as claimed in claim 1, wherein the first writing part comprises a comparison displaying part displaying a comparison result from comparing the setting information stored in a storage unit internally mounted in the image forming apparatus with the setting information written in the portable recording medium, at an operation panel.

7. The image forming apparatus as claimed in claim 1, wherein the first writing part comprises a first converting part converting the setting information into a shell command format.

8. The image forming apparatus as claimed in claim 1, wherein the writing part comprises a second converting part converting the setting information into a Print Job Language format.

9. An image forming apparatus, comprising:
an interface detachably connecting a portable recording medium;
a reading part reading setting information stored in the portable recording medium when the portable recording medium is detachably connected to the interface;
a second writing part writing the setting information read by the reading part to a storage unit internally mounted in the image forming apparatus;
a determining part determining whether or not the setting information is written to the storage unit by the second writing part; and
a setting information displaying part displaying one or more sets of the setting information, which are determined to be written by the determining part, as a list of the sets of the setting information which can be selected by a user, wherein
the determining part acquires the setting information which can be written to a storage unit internally mounted to the image forming apparatus from the one or more sets of the setting information stored in the portable recording medium, and determines whether or not the setting information can be written to the storage unit.

10. The image forming apparatus as claimed in claim 9, wherein
the determining part acquires the setting information of another image forming apparatus belonging to the same group as the image forming apparatus from the one or more sets of the setting information stored in the portable recording medium, and determines whether or not the setting information can be written to the storage unit.

11. An image forming apparatus, comprising:
an interface detachably connecting a portable recording medium;
a reading part reading setting information stored in the portable recording medium when the portable recording medium is detachably connected to the interface;
a second writing part writing the setting information read by the reading part to a storage unit internally mounted in the image forming apparatus;
a determining part determining whether or not the setting information is written to the storage unit by the second writing part; and
a setting information displaying part displaying the setting information which is determined to be written by the determining part as a list of one or more sets of the setting information which can be selected by the user, wherein
the determining part acquires the setting information of the image forming apparatus itself from the one or more sets of the setting information stored in the portable recording medium, and determines whether or not the setting information can be written to the storage unit.

12. The image forming apparatus as claimed in claim 11, further comprising:

a first writing part writing the setting information stored in a storage unit internally mounted in the image forming apparatus and device type information identifying a device type of the image forming apparatus to a portable recording medium, wherein the first writing part acquires a time of writing the setting information by a time acquisition part mounted to the image forming apparatus, and writing the setting information, the time as a recorded time, and the device type information of the image forming apparatus, and when the determining part determines that the setting information read by the reading part is the setting information of the image forming apparatus itself, the setting information displaying part displays a list of one or more sets of the setting information and the time of writing at a display unit.

13. The image forming apparatus as claimed in claim 11, wherein the second writing part writes setting items of the setting information which can be set in common, based on additional information indicating whether or not the setting item can be set in common among other image forming apparatus, the additional information set for each setting item.

14. The image forming apparatus as claimed in claim 13, wherein as additional information, a first additional information indicating whether or not the setting item can be set in common among different device types, a second additional information indicating whether or not the setting item can be set in common among different devices being the same device type as the image forming apparatus, and a third additional information indicating whether or not the setting item is prohibited to be set in common among the different devices are added for each setting item of the setting information.

15. An image forming apparatus, comprising:

an interface detachably connecting a portable recording medium;

a first writing part writing setting information, stored in a storage unit internally mounted in the image forming apparatus, and device type information identifying a device type of the image forming apparatus, to the portable recording medium when the portable recording medium is detachably connected to the interface; and a reading part indicating whether or not the setting information stored in the portable recording medium is read, when the portable recording medium is detachably connected to the interface, wherein the first writing part adds additional information indicating whether or not a setting item can be used in common among other image forming apparatuses for each setting item of the setting information when writing the setting information to the portable recording medium.

16. The image forming apparatus as claimed in claim 15, wherein the first writing part displays a comparison result from comparing the setting information stored in the storage unit of the image forming apparatus and the setting information written in the portable recording medium, at an operation panel.

17. The image forming apparatus as claimed in claim 15, wherein the reading part displays a comparison result from comparing the setting information stored in the storage unit of the image forming apparatus and the setting information written in the portable recording medium, at an operation panel.

* * * * *